US012647232B2

(12) United States Patent
Nilsson et al.

(10) Patent No.: US 12,647,232 B2
(45) Date of Patent: Jun. 2, 2026

(54) WIRELESS DEVICE, NETWORK NODE, AND METHODS PERFORMED THEREBY, FOR FREQUENCY ALLOCATIONS OF SOUNDING REFERENCE SIGNALS

(71) Applicant: Telefonaktiebolaget LM Ericsson (publ), Stockholm (SE)

(72) Inventors: Andreas Nilsson, Gothenburg (SE); Mattias Frenne, Uppsala (SE); Robert Mark Harrison, Grapevine, TX (US); Sven Petersson, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 558 days.

(21) Appl. No.: 17/925,392

(22) PCT Filed: May 11, 2021

(86) PCT No.: PCT/SE2021/050445

§ 371 (c)(1),
(2) Date: Nov. 15, 2022

(87) PCT Pub. No.: WO2021/230795

PCT Pub. Date: Nov. 18, 2021

(65) Prior Publication Data

US 2023/0379118 A1 Nov. 23, 2023

Related U.S. Application Data

(60) Provisional application No. 63/025,612, filed on May 15, 2020.

(51) Int. Cl.
H04L 5/00 (2006.01)
(52) U.S. Cl.
CPC .......... H04L 5/0051 (2013.01); H04L 5/0007 (2013.01)

(58) Field of Classification Search
CPC .... H04L 5/0051; H04L 5/0007; H04L 5/0053
See application file for complete search history.

(56) References Cited

U.S. PATENT DOCUMENTS

| | | | |
|---|---|---|---|
| 2011/0310818 A1 | 12/2011 | Lin et al. | |
| 2012/0113967 A1* | 5/2012 | Smith ................. | H04B 1/7143 375/E1.033 |

(Continued)

FOREIGN PATENT DOCUMENTS

| | | |
|---|---|---|
| EP | 2437402 A1 | 4/2012 |

OTHER PUBLICATIONS

International Search Report and Written Opinion dated Jul. 27, 2021 for International Patent Application No. PCT/SE2021/050445 filed May 11, 2021, consisting of 11-pages.

(Continued)

*Primary Examiner* — Luat Phung
(74) *Attorney, Agent, or Firm* — Weisberg I.P. Law, P.A.

(57) ABSTRACT

A method performed by a wireless device of configuring uplink sounding transmissions is provided. The method includes receiving, from a network node, receiving, from a network node, different sets of configuration parameters for sounding signal transmissions for the wireless device. Each of the different sets of configuration parameters includes a time-domain parameter and different frequency allocations. The method further includes receiving, from the network node, downlink control information, DCI, comprising information that indicates which of the configured frequency allocations that should be applied for the SRS transmission. Furthermore, the method includes generating a sounding reference signal based on the received DCI.

20 Claims, 14 Drawing Sheets

(56) References Cited

U.S. PATENT DOCUMENTS

| | | | |
|---|---|---|---|
| 2020/0100232 A1* | 3/2020 | Onggosanusi | H04B 7/0695 |
| 2020/0228248 A1* | 7/2020 | Islam | H04L 5/0055 |
| 2021/0250149 A1* | 8/2021 | Muruganathan | H04L 5/0048 |
| 2022/0210803 A1* | 6/2022 | Liu | H04L 1/08 |

OTHER PUBLICATIONS

3GPP TSG RAN WG1 Meeting #97 R1-1906119; Title: Discussion on remaining issues on additional SRS symbols; Agenda item: 6.2.3.1.1; Source: Vivo; Document for: Discussion and Decision; Date and Location: May 13-17, 2019, Reno, USA, consisting of 5-pages.
ETSI TS 138 211 V15.8.0; Technical Specification; 5G;NR; Physical channels and modulation (3GPP TS 38.211 version 15.8.0 Release 15); Jan. 2020, consisting of 100-pages.
ETSI TS 138 213 V15.3.0; Technical Specification; 5G;NR; Physical layer procedures for control (3GPP TS 38.213 version 15.3.0 Release 15); Oct. 2018, consisting of 102-pages.
ETSI TS 138 214 V15.3.0; Technical Specification; 5G;NR; Physical layer procedures for data (3GPP TS 38.214 version 15.3.0 Release 15); Oct. 2018, consisting of 99-pages.
ETSI TS 138 331 V15.8.0; Technical Specification; 5G;NR; Radio Resource Control (RRC); Protocol Specification (3GPP TS 38.331 version 15.8.0 Release 15); Jan. 2020, consisting of 527-pages.

* cited by examiner

Figure 2:
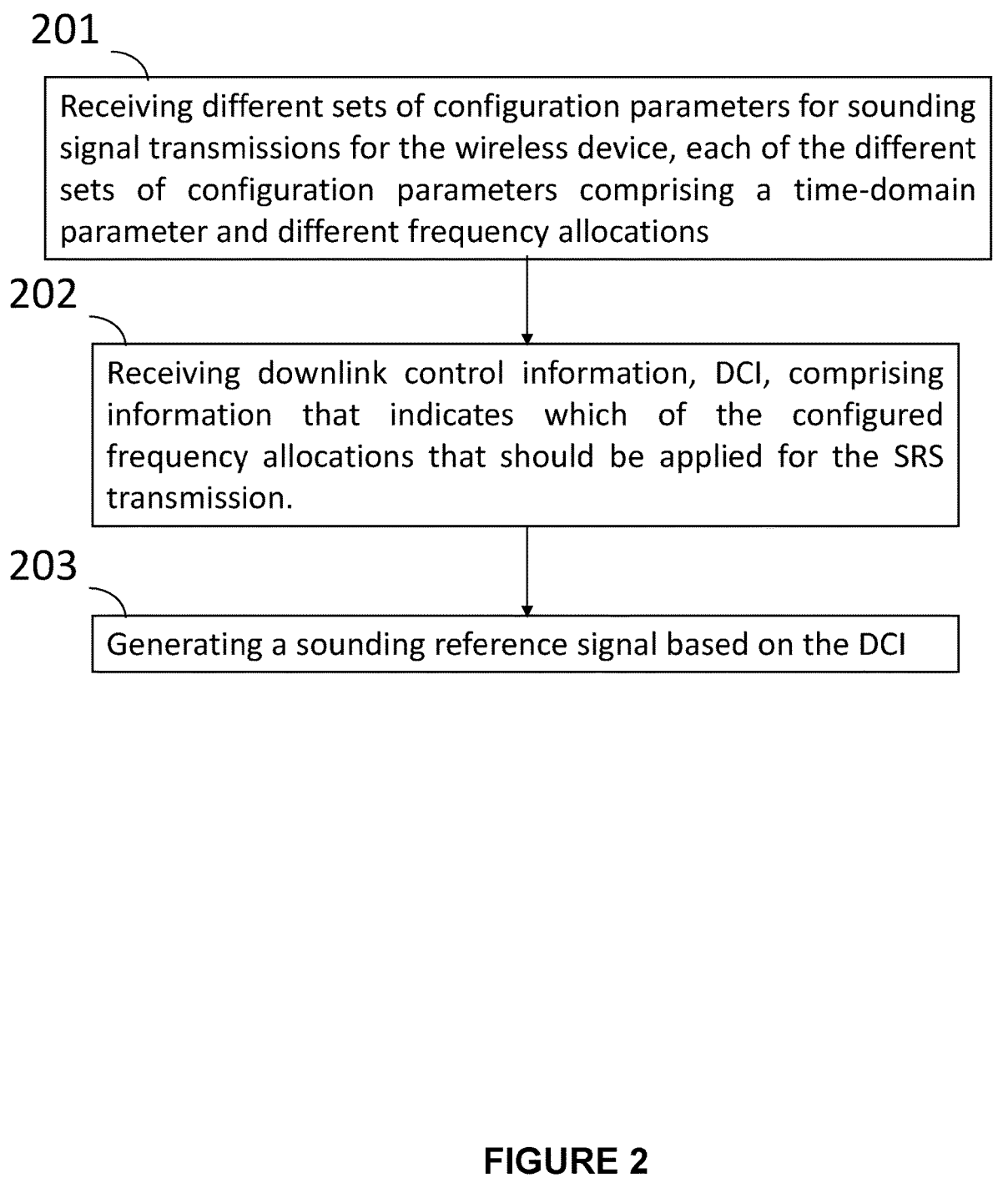

201

Receiving different sets of configuration parameters for sounding signal transmissions for the wireless device, each of the different sets of configuration parameters comprising a time-domain parameter and different frequency allocations

202

Receiving downlink control information, DCI, comprising information that indicates which of the configured frequency allocations that should be applied for the SRS transmission.

203

Generating a sounding reference signal based on the DCI

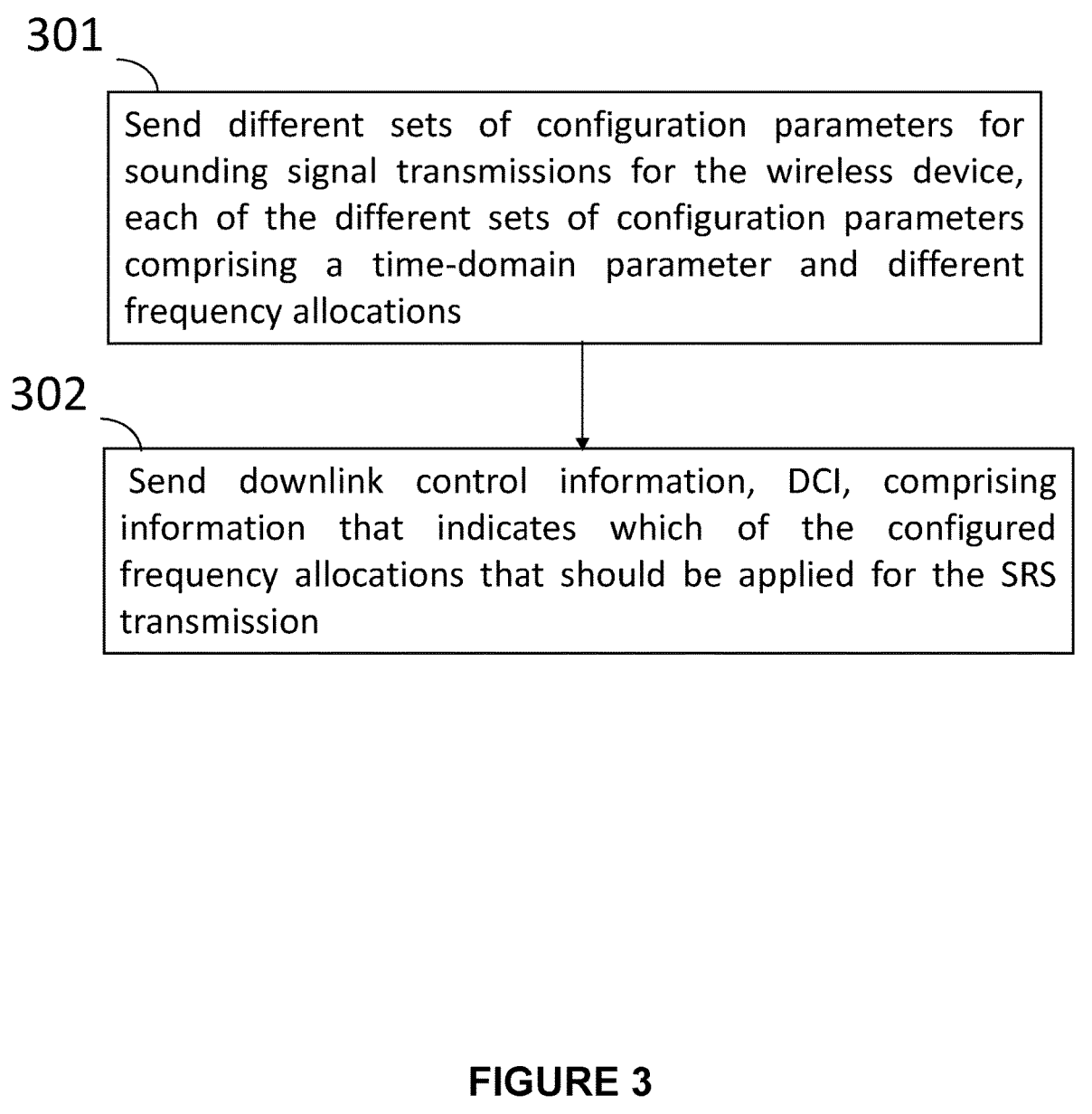

Send different sets of configuration parameters for sounding signal transmissions for the wireless device, each of the different sets of configuration parameters comprising a time-domain parameter and different frequency allocations

302

Send downlink control information, DCI, comprising information that indicates which of the configured frequency allocations that should be applied for the SRS transmission

FIGURE 3

SRS resource allocation

Frequency

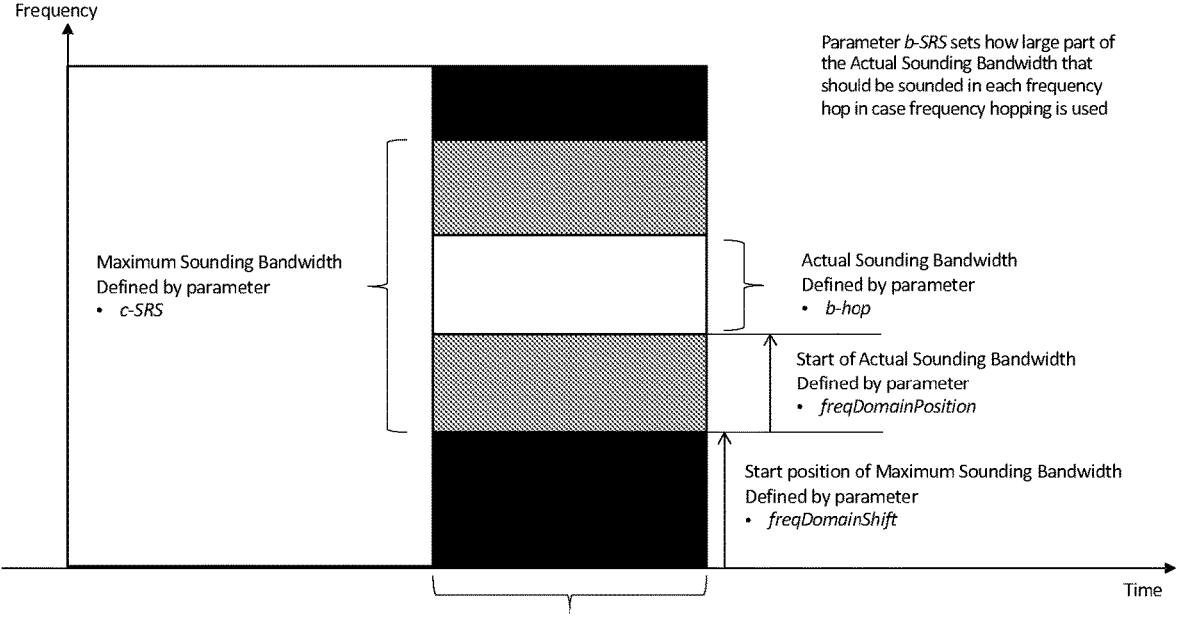

Parameter *b-SRS* sets how large part of the Actual Sounding Bandwidth that should be sounded in each frequency hop in case frequency hopping is used Maximum Sounding Bandwidth Defined by parameter
• *c-SRS*

Actual Sounding Bandwidth Defined by parameter
• *b-hop*

Start of Actual Sounding Bandwidth Defined by parameter
• *freqDomainPosition*

Start position of Maximum Sounding Bandwidth Defined by parameter
• *freqDomainShift*

Time

An SRS resource can be in 4 out of the last 6 OFDM symbols of a slot
Defined by parameters:
• *startPosition*
• *nrofSymbols*

FIGURE 4

SRS transmission using frequency hopping
SRS transmission using repetition
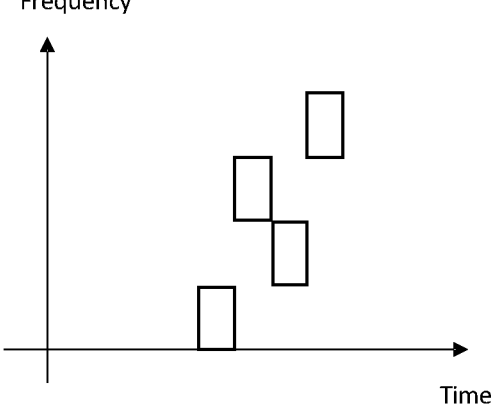
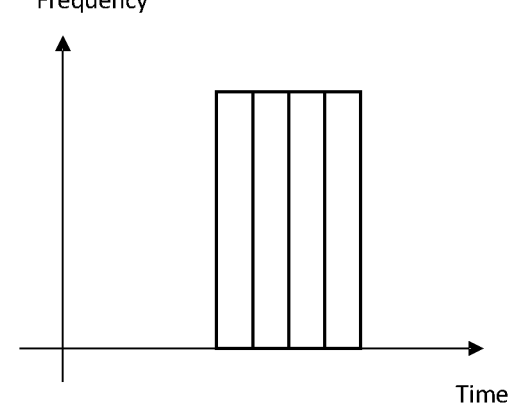
FIGURE 5

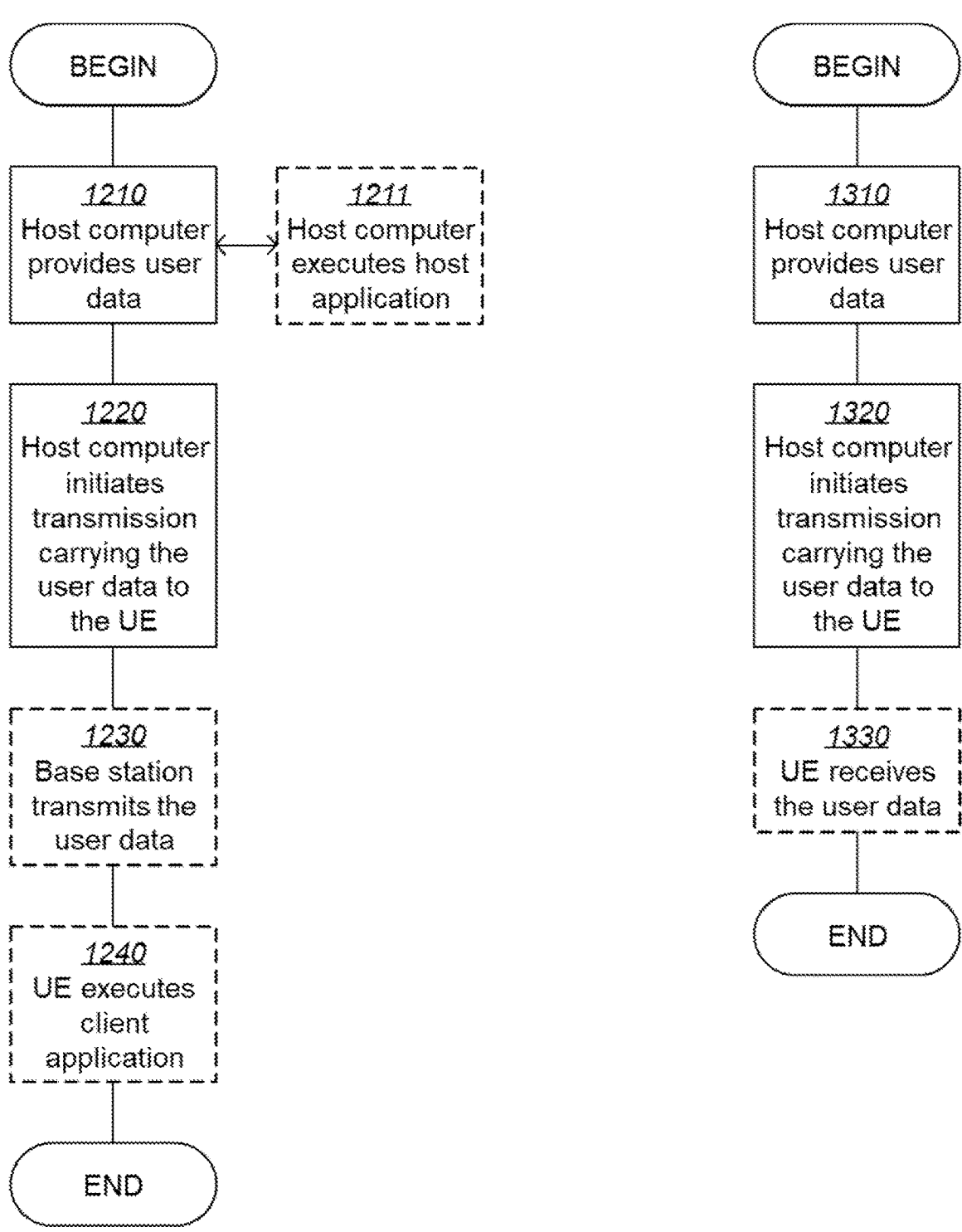
FIGURE 11                               FIGURE 12

WIRELESS DEVICE, NETWORK NODE, AND METHODS PERFORMED THEREBY, FOR FREQUENCY ALLOCATIONS OF SOUNDING REFERENCE SIGNALS

CROSS-REFERENCE TO RELATED APPLICATIONS

This application is a Submission Under 35 U.S.C. § 371 for U.S. National Stage Patent Application of International Application No.: PCT/SE2021/050445, filed May 11, 2021 entitled "WIRELESS DEVICE, NETWORK NODE, AND METHODS PERFORMED THEREBY, FOR FREQUENCY ALLOCATIONS OF SOUNDING REFERENCE SIGNALS," which claims priority to U. S. Provisional Application No.: 63/025612, filed May 15, 2020, entitled "WIRELESS DEVICE, NETWORK NODE, AND METHODS PERFORMED THEREBY, FOR FREQUENCY ALLOCATIONS OF SOUNDING REFERENCE SIGNALS," the entireties of both of which are incorporated herein by reference.

TECHNICAL FIELD

The present invention generally relates to uplink sounding reference signals, and particularly relates to frequency allocations of uplink sounding reference signal transmissions.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE) or New Radio (NR), base stations, which may be referred to as eNodeBs or even eNBs, or gNBs, respectively, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Sounding Reference Signal (SRS) Will Now be Described.

The sounding reference signal (SRS) is used in the LTE and NR to estimate the channel in the UL. The application for the SRS is mainly to provide a pilot signal to evaluate the channel quality in order to, e.g., derive the appropriate transmission/reception beams or to perform link adaptation, e.g. setting the modulation and coding scheme (MCS) and the multiple-input multiple-output (MIMO) precoder for physical uplink shared channel (PUSCH) transmission. The signal functions similarly to the DL channel-state information reference signal (CSI-RS), which provide beam management and link adaptation functions in the DL.

The SRS signal is configured via radio resource control (RRC) and some parts of the configuration can be updated by medium access control (MAC) control element (CE) signaling to avoid using RRC which is slower than MAC CE. The configuration includes the SRS resource allocation, i.e., the physical resource and sequences to use as well as the aperiodic/periodic/semi-persistent behavior. For aperiodic SRS transmission, the RRC configuration does not activate an SRS transmission from the UE but instead a dynamic activation trigger is transmitted via the physical downlink control channel's (PDCCH) downlink control information (DCI) in the DL from the gNB to trigger the UE to transmit the SRS once, at a predetermined time.

SRS configuration may be static and inflexible in the frequency-domain allocation. The bandwidth used for SRS is configured using RRC signaling, which means that whenever it needs to be reconfigured, the signaling is slow and overhead heavy since it involves an RRC message that is transmitted over the physical downlink shared channel (PDSCH).

SUMMARY

According to various embodiments of inventive concepts, a method performed by a wireless device of configuring uplink sounding transmissions is provided. The method includes receiving, from a network node, receiving, from a network node, different sets of configuration parameters for sounding signal transmissions for the wireless device. Each of the different sets of configuration parameters includes a time-domain parameter and different frequency allocations. The method further includes receiving, from the network node, downlink control information, DCI, comprising information that indicates which of the configured frequency allocations that should be applied for the SRS transmission.

Furthermore, the method includes generating a sounding reference signal based on the received DCI.

Corresponding embodiments of inventive concepts for a wireless device, computer program products, and computer programs are also provided.

According to other embodiments of inventive concepts, a method performed by a network node of configuring uplink sounding transmissions for a wireless device in a wireless communication network.is provided. The method includes sending, to a wireless device, different sets of configuration parameters for sounding signal transmissions for the wireless device. Each of the different sets of configuration parameters includes a time-domain parameter and different frequency allocations. The method further includes sending, to a wireless device, downlink control information, DCI, including information that indicates which of the configured frequency allocations that should be applied for the SRS transmission.

Corresponding embodiments of inventive concepts for a network node, computer program products, and computer programs are also provided.

SRS configuration may be static and inflexible in the frequency-domain allocation, in particular in NR. In addition, the resource blocks, RBs, used for SRS transmission are selected in a nonsequential (pseudo-random) order through the use of frequency hopping etc. This makes it cumbersome to perform sounding for a very specific part of the bandwidth (e.g. a few RBs) in an easy manner. It is a problem how to introduce an SRS transmission mode that removes the pseudo-randomness from the SRS time and frequency allocation.

This static SRS configuration with pseudo-random behavior may become a bottleneck in deployments using mixed services and verticals with different demands on bandwidth. Therefore, some RBs should be avoided from SRS transmission as it may interfere or collide with other transmissions from the same or other UEs. Also, interference environment becomes more complicated and there is an increasing need to be able to adapt the SRS bandwidth more dynamically to avoid colliding with interference in some RBs or to avoid creating unnecessary interference. This is a problem addressed in the embodiments.

Further, narrowband sounding provides good coverage, but it is also possible that due to frequency-selective fading in the channel, the sounded few RBs of the SRS are located in a fading dip.

Various embodiments of the present disclosure may provide solutions to these and other potential problems. In various embodiments of the present disclosure, a wireless device and a network node(s) operation to provide a method for configuring SRS. For example, the operations may allow a wireless device or network node to allocate the SRS transmission bandwidth or RBs dynamically, by using DCI signaling. This may be an extension of aperiodic triggering in LTE and NR that gives more flexibility to allocate RB for SRS transmission compared to the RRC based configuration in NR. Also, by enabling a more flexible frequency allocation for SRS the coverage can be improved.

Further, reducing the SRS frequency band when the full bandwidth does not need to be sounded, or due to coverage problem with sounding the whole bandwidth, allows other UEs to be scheduled on the un-used parts of the frequency band, which will improve UL capacity.

The bandwidth used for SRS is configured using RRC signaling, which means that whenever it needs to be reconfigured, the signaling is slow and overhead heavy since it involves an RRC message that is transmitted over the physical downlink shared channel (PDSCH). In the embodiments there is provided methods and devices where the wireless device is configured with SRS that includes several different frequency allocations, for example one frequency allocation may include a relatively narrow bandwidth for channel estimation and another frequency allocation may include the full bandwidth. The frequency allocation are switch by the network by sending a downlink control information, DCI, messages which indicates a frequency allocation among the configured SRS frequency allocations. This allows a faster switching between the different frequency allocations for the SRS.

BRIEF DESCRIPTION OF THE DRAWINGS

Examples of embodiments herein are described in more detail with reference to the accompanying drawings, according to the following description.

FIG. 2 is a flowchart depicting a method in a wireless device, according to embodiments herein.

FIG. 3 is a flowchart depicting a method in a network node, according to embodiments herein.

FIG. 4 is a schematic block diagram illustrating aspects of a method performed by wireless device, according to embodiments herein.

FIG. 5 is a schematic block diagram illustrating aspects of a method performed by wireless device, according to embodiments herein.

FIG. 11 is a flowchart depicting embodiments of a method in a communications system including a host computer, a base station and a user equipment, according to embodiments herein.

FIG. 12 is a flowchart depicting embodiments of a method in a communications system including a host computer, a base station and a user equipment, according to embodiments herein.

DETAILED DESCRIPTION

Figure 1:
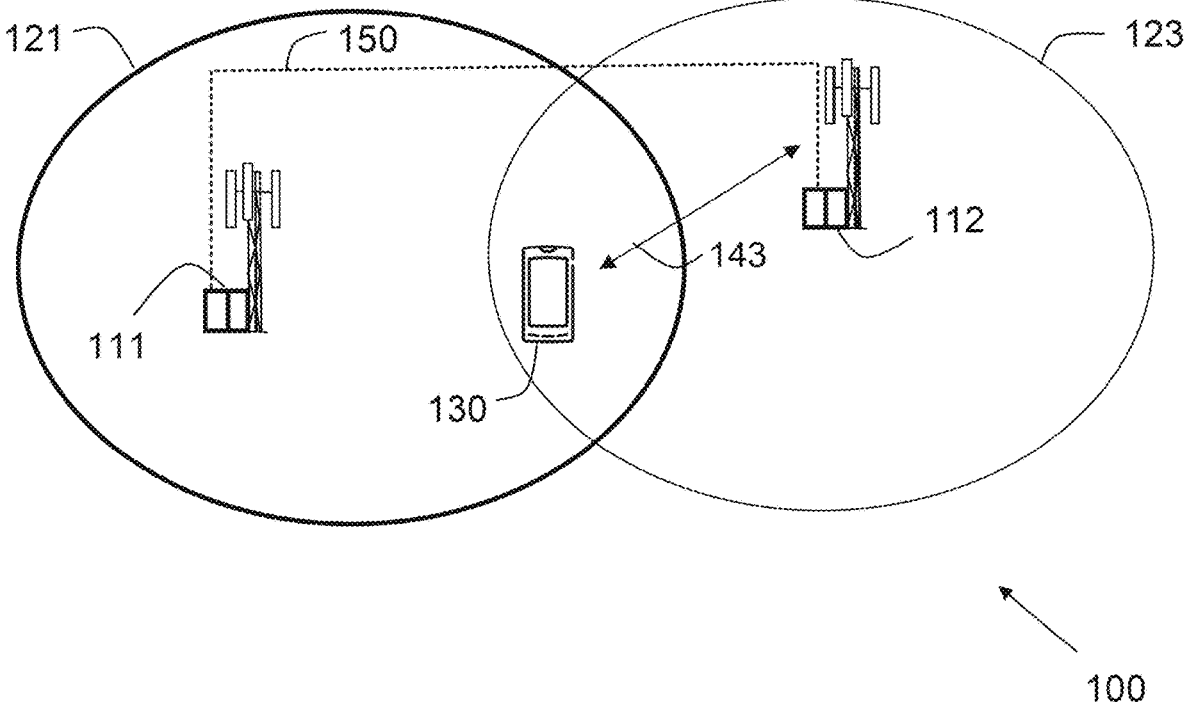
FIG. 1 is a schematic diagram an example of a wireless communications network, according to embodiments herein.

As part of the development of embodiments herein, one or more challenges with the existing technology will first be identified and discussed.

Srs Configuration:

The SRS configuration enables generation of an SRS transmission. Th SRS transmission is based on a SRS resource configuration grouped into SRS resource sets. Each SRS resource is configured with the following abstract syntax notation (ASN) code in RRC (see 3GPP 38.331 version 15.8):

The time-domain position of an SRS resource within a given slot is configured with the RRC parameter resourceMapping.

a. A time-domain start position for the SRS resource, which is limited to be one of the last 6 symbols in a slot, is configured by the RRC parameter startPosition.

```
SRS-Resource : :=               SEQUENCE {
    srs-ResourceId                  SRS-ResourceId,
    nrofSRS-Ports                   ENUMERATED {port1, ports2, ports4},
    ptrs-PortIndex                  ENUMERATED {n0, n1 }
OPTIONAL, -- Need R
    transmissionComb                CHOICE {
        n2                              SEQUENCE {
            combOffset-n2                   INTEGER (0..1),
            cyclicShift-n2                  INTEGER (0..7)
        } ,
        n4                              SEQUENCE {
            combOffset-n4                   INTEGER (0..3),
            cyclicShift-n4                  INTEGER (0..11)
        }
    } ,
    resourceMapping                 SEQUENCE {
        startPosition                   INTEGER (0..5),
        nrofSymbols                     ENUMERATED {n1, n2, n4},
        repetitionFactor                ENUMERATED {n1, n2, n4}
    },
    freqDomainPosition              INTEGER (0..67),
    freqDomainShift                 INTEGER (0..268),
    freqHopping                     SEQUENCE {
        c-SRS                           INTEGER (0..63),
        b-SRS                           INTEGER (0..3),
        b-hop                           INTEGER (0..3)
    },
    groupOr SequenceHopping         ENUMERATED { neither, groupHopping,
sequenceHopping },
    resourceType                    CHOICE {
        aperiodic                       SEQUENCE {
            . . .
        },
        semi-persistent                 SEQUENCE {
            periodicityAndOffset-sp             SRS-PeriodicityAndOffset,
            . . .
        },
        periodic                        SEQUENCE {
            periodicityAndOffset-p              SRS-PeriodicityAndOffset,
            . . .
        }
    },
    sequenceId                      INTEGER (0..1023),
    spatialRelationInfo             SRS-SpatialRelationInfo
OPTIONAL, -- Need R
    . . .
}
```

To create the SRS resource on the time-frequency grid with the current RRC configuration, each SRS resource is thus configurable with respect to:

The transmission comb (i.e., mapping to every nth subcarrier, where n=2 or n=4), configured by the RRC parameter transmissionComb.

a. For each SRS resource, a comb offset, configured by the RRC parameter combOffset, is specified (i.e., which of the n combs to use).

b. A cyclic shift, configured by the RRC parameter cyclicShift, of the SRS sequence that maps to the assigned comb is also specified. The cyclic shift increases the number of SRS resources that can be mapped to a comb, but there is a limit on how many cyclic shifts that can be used that depends on the transmission comb being used.

b. A number of orthogonal frequency-division multiplexing (OFDM) symbols for the SRS resource (that can be set to 1, 2 or 4) is configured by the RRC parameter nrofSymbols.

c. A repetition factor (that can be set to 1, 2 or 4) configured by the RRC parameter repetitionFactor. When this parameter is larger than 1, the same frequency resources are used multiple times across OFDM symbols, used to improve the coverage as more energy is collected by the receiver. It can also be used for beam-management functionality, where the gNB can probe different receive beams for each repetition.

The frequency-domain sounding bandwidth and position of an SRS resource in a given OFDM symbol (i.e., which part of the system bandwidth is occupied by the SRS resource) is configured with the RRC parameters freqDomainPosition, freqDomainShift and the freqHopping parameters: c-SRS, b-SRS and b-hop. The smallest possible sounding bandwidth in a given OFDM symbol is 4 resource blocks (RBs).

A schematic description of how an SRS resource is allocated in time and frequency in a given OFDM symbol within a slot is provided in FIG. 4. Note that c-SRS controls the maximum sounding bandwidth, which can be smaller than the maximum transmission bandwidth the UE supports. For example, the UE may have capability to transmit over 40 MHz bandwidth, but c-SRS is set to a smaller value corresponding to 5 MHz, thereby focusing the available transmit power to a narrowband transmission which improves the SRS coverage.

Since the frequency-domain sounding bandwidth of an SRS resource set is configured using RRC signaling, it is cumbersome to change the frequency-domain sounding bandwidth of an SRS resource set. With the current standard specification, it is however possible to configure a UE with multiple SRS resource sets where the different SRS resource sets are configured with different frequency-domain sounding bandwidths. The gNB can then trigger transmission of a specific SRS resource set depending on the desired frequency-domain sounding bandwidth. However, since there are strict limits of number of configurable SRS resource sets for each usage, the potential for this solution is very limited. For example, maximum one SRS resource set with usage 'codebook' or 'nonCodebook' is allowed, maximum two SRS resource sets with usage 'antennaSwitching' is allowed, and SRS resource set with usage 'beamManagement' is only mandatory for UEs not supporting beam correspondence and is only applicable for FR2 frequencies.

The RRC parameter resourceType configures whether the resource is transmitted as periodic, aperiodic (singe transmission triggered by DCI), or semi persistent (same as periodic but the start and stop of the periodic transmission is controlled by MAC CE signaling instead of RRC signaling). The RRC parameter sequenceId specifies how the SRS sequence is initialized and the RRC parameter spatialRelationInfo configures the spatial relation for the SRS beam with respect to a reference signal (RS) which can be either another SRS, synchronization signal block (SSB) or CSI-RS. Hence, if the SRS has a spatial relation to another SRS, then this SRS should be transmitted with the same beam (i.e., spatial transmit filter) as the indicated SRS.

The SRS resource is configured as part of an SRS resource set. Within a set, the following parameters, which are common to all resources in the set, are configured in RRC:

The associated CSI-RS resource (this configuration is only applicable for non-codebook-based UL transmission) for each of the possible resource types (aperiodic, periodic and semi persistent). For aperiodic SRS, the associated CSI-RS resource is set by the RRC parameter csi-RS. For periodic and semi-persistent SRS, the associated CSI-RS resource is set by the RRC parameter associatedCSI-RS. Note that all resources in a resource set must share the same resource type.

For aperiodic resources, the slot offset is configured by the RRC parameter slotOffset and sets the delay from the PDCCH trigger reception to start of the transmission of the SRS resources measured in slots.

The resource usage, which is configured by the RRC parameter usage sets the constraints and assumption on the resource properties (see 3GPP 38.214).

The power-control RRC parameters alpha, p0, pathlossReferenceRS (indicating the downlink RS that can be used for path loss estimation) and srs-PowerControlAdjustmentStates, which are used for determining the SRS transmit power.

Each SRS resource set is configured with the following ASN code in RRC (see 3GPP 38.331 version 15.8):

```
SRS-ResourceSet : :=                          SEQUENCE {
    srs-ResourceSetId                             SRS-ResourceSetId,
    srs-ResourceIdList                            SEQUENCE (SIZE (1..maxNrofSRS-ResourcesPerSet) ) OF
                SRS-ResourceId OPTIONAL, -- Cond Setup
    resourceType                                  CHOICE {
        aperiodic                                     SEQUENCE {
            aperiodicSRS-ResourceTrigger                  INTEGER (1. .maxNrofSRS-TriggerStates-1) ,
            csi-RS                                        NZP-CSI-RS-ResourceId
                OPTIONAL, -- Cond NonCodebook
            slotOffset                                    INTEGER (1. .32)
                OPTIONAL, -- Need S
            . . . ,
            [ [
            aperiodicSRS-ResourceTriggerList-v1530        SEQUENCE (SIZE (1. .maxNrofSRS-
                TriggerStates-2) )
                                                              OF INTEGER (1. .maxNrofSRS-
            TriggerStates-1) OPTIONAL -- Need M
            ] ]
        },
        semi-persistent                               SEQUENCE {
            associatedCSI-RS                              NZP-CSI-RS-ResourceId
                OPTIONAL, -- Cond NonCodebook
            . . .
        },
        periodic                                      SEQUENCE {
            associatedCSI-RS                              NZP-CSI-RS-ResourceId
                OPTIONAL, -- Cond NonCodebook
            . . .
        }
    },
    usage                                         ENUMERATED {beamManagement, codebook, nonCodebook,
    antennaSwitching},
    alpha                                         Alpha
                OPTIONAL, -- Need S
```

-continued

| p0 | INTEGER (−202. .24) |
| OPTIONAL, -- Cond Setup | |
|    pathlossReferenceRS | CHOICE { |
|      ssb-Index |    SSB-Index, |
|      csi-RS-Index |    NZP-CSI-RS-ResourceId |
|    } | |
| OPTIONAL, -- Need M | |
|    srs-PowerControlAdjustmentStates | ENUMERATED { sameAsFci2, separateClosedLoop} |
| OPTIONAL, -- Need S | |
|    . . . | |
| } | |

Hence, it can be seen that in terms of resource allocation, the resource set configures resource usage, power control, aperiodic transmission timing, and DL resource association. The resource configuration controls the time-and-frequency allocation, the periodicity and offset of each resource, the sequence ID for each resource and the spatial relation information.

Resource Mapping to Antenna Ports

SRS resources can be configured with four different usages:
'beamManagement', 'codebook', 'nonCodebook' or 'antennaSwitching'.

SRS resources in an SRS resource set configured with usage 'beamManagement' are mainly applicable for frequency bands above 6 GHz (i.e., for frequency range 2 (FR2)) and the purpose is to allow the UE to evaluate different UE transmit beams for wideband (e.g. analog) beamforming arrays. The UE will then transmit one SRS resource per wideband beam, and the gNB will perform reference signal received power (RSRP) measurement on each of the transmitted SRS resources and in this way determine a suitable UE transmit beam. The gNB can then inform the UE which transmit beam to use by updating the spatial relation for different UL RSs, for more info about spatial relations. It is expected that the gNB will configure the UE with one SRS resource set with usage 'beamManagement' for each analog array (panel) that the UE has. In NR release 15 it is up to UE implementation how to associate the SRS resource set with usage 'beamManagement' to the different UE panels, however it is discussed in 3GPP to have a fixed mapping between a certain UE panel and a certain SRS resource set, so that the gNB can get more control of how the UE uses the different UE panels. It is also expected that each SRS resource in the set will contain either one or two SRS ports depending on if the analog panel has one or two polarizations.

SRS resources in an SRS resource set configured with usage 'codebook' are used to sound the different UE antennas and let the gNB determine suitable precoders, rank and MCS for coming UL transmission. How each SRS port is mapped to each UE antenna is up to UE implementation, but it is expected that one SRS port will be transmitted per UE antenna, i.e. the SRS port to antenna-port mapping will be an identity matrix.

SRS resources in an SRS resource set configured with usage 'nonCodebook' are used to sound different potential precoders, autonomously determined by the UE. The UE determines a set of candidate precoders based on reciprocity, transmits one SRS resource per candidate precoder, and the gNB can then select which precoders the UE should use for coming PUSCH transmissions. One UL layer will be transmitted per indicated candidate precoder. How the UE maps the SRS resources to the antenna ports is up to UE implementation and depends on the channel realization.

SRS resources in an SRS resource set configured with usage 'antennaSwitching' are used to sound the channel in the UL so that the gNB can use reciprocity to determine suitable DL precoders. If the UE has the same number of transmit and receive chains, the UE is expected to transmit one SRS port per UE antenna. The mapping from SRS ports to antenna ports is, however, up to the UE to decide and is transparent to the gNB.

In NR release 16, a new usage for SRS, 'positioning', was agreed to handle the case of SRS used for the sake of positioning. Within this usage, an SRS resource may be configured with a comb-based pattern that is more flexible than the one available in NR release 15. One limitation with the positioning SRS is that only single-port transmission is supported, which means that each triggered SRS set only can be used to sound one single UE antenna.

SRS Coverage

Uplink coverage for SRS is identified as a bottleneck for NR and a limiting factor for DL reciprocity-based operation. Some measures to improve the coverage of SRS has been adopted in NR, for example repetition of an SRS resource and/or frequency hopping. One example of frequency hopping is illustrated in the left part of FIG. 5, where different parts of the frequency band is sounded in different OFDM symbols, which means that the power spectral density (PSD) for the SRS will improve. Here, the illustrated frequency-hopping pattern is set according to Section 6.4.1.4.3 of 3GPP 38.211 (version 15.8). The right part of FIG. 6 illustrates an example of repetition, where one SRS resource is transmitted in four consecutive OFDM symbols, which will increase the processing gain of the SRS.

SRS Power Scaling

SRS has its own UL power control (PC) scheme in NR, which can be found in Section 7.3 in 3GPP 38.213. The SRS output power (P_SRS) the UE should use for a given SRS transmission is given by the formula:

$$P_{SRS,b,f,c}(i, q_s, l) = \min \left\{ \begin{array}{l} P_{CMAX,f,c}(i), \\ P_{O\_SRS,b,f,c}(q_s) + 10\log_{10}(2^{\mu} \cdot M_{SRS,b,f,c}(i)) + \\ \alpha_{SRS,b,f,c}(q_s) \cdot PL_{b,f,c}(q_s) + h_{b,f,c}(i, l) \end{array} \right\}$$

Section 7.3 in 38.213 additionally specifies how the UE should split the above output power, P_SRS, between two-or-more different SRS ports transmitted during one SRS transmit occasion. An SRS transmit occasion is a time window within a slot where SRS transmission is performed: "For SRS, a UE splits a linear value $P_{(sRs,b,f,c)}(i,q_s,I)$ of the transmit power $P_{(sRs,b,f,c)}(i,q_s,I)$ on active UL BWP b of carrier f of serving cell c equally across the configured antenna ports for SRS".

SRS Time Bundling

SRS time bundling means multiple SRS transmissions are performed by a UE at different time slots and that the receiver (e.g., the gNB) can combine the multiple SRS transmissions in different ways in order to improve the quality of the channel state information (CSI) at the gNB. The phase (and potentially also the amplitude) of the UE transmit chains at the occasions of the different SRS transmissions can experience different levels of coherency (i.e., different levels of phase and amplitude similarity)

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

FIG. 1 depicts a non-limiting example of a wireless network or wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 comprises a plurality of network nodes, whereof a first network node 111 and a second network node 112 are depicted in the non-limiting example of FIG. 1. In other examples, which are not depicted in FIG. 1, any of the first network node 111 and the second network node 112 may be a distributed node, such as a virtual node in the cloud, and may perform its functions entirely on the cloud, or partially, in collaboration with a radio network node. The expression "a network node 111, 112" may be used herein to refer to any of the first network node 111 and the second network node 112.

Each of the first network node 111 and the second network node 112 may be understood to be a radio network node. That is, a transmission point such as a radio base station, for example a gNB, an eNB, or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 may comprise at least one of: a first group of cells 121 and a second group of cells 123. The first group of cells 121 may be, for example, a MCG. The second group of cells 123 may be, for example, a SCG. The first group of cells 121 may comprise a first cell, and one or more second cells. That is, each of the first group of cells 121 and the second group of cells may comprise one or more cells. In the non-limiting example depicted FIG. 1, only the first cell is depicted to simplify the Figure. The first cell maybe a primary cell (PCell) and each of the one or more second cells may be a secondary cell (SCell). In the non-limiting example depicted in FIG. 1, the first network node 111 is a radio network node that serves the first cell. The first network node 111 may, in some examples, serve receiving nodes, such as wireless devices, with serving beams.

The second group of cells 123 may comprise a third cell, and one or more fourth cells. In the non-limiting examples depicted in FIG. 1, only the third cell is depicted to simplify the Figure. The third cell maybe a primary secondary cell (PSCell) and each of the one or more fourth cells may be a secondary cell (SCell). In the non-limiting example depicted in FIG. 1, the second network node 112 is a radio network node that serves the third cell. The second network node 112 may serve receiving nodes, such as wireless devices, with serving beams.

The first network node 111, in some examples, may be a MN.

The second network node 112, in some examples, may be a SN.

In some examples, both of the first network node 111 and the second network node 112 may each be a gNB.

In LTE, any of the first network node 111 and the second network node 112 may be referred to as an eNB. In some examples, the first network node 111 may be an eNB as MN, and the second network node 112 may be a gNB as SN. It may be noted that although the description of embodiments herein may focus on the LTE-NR tight interworking case, where the LTE is the master node, embodiments herein may be understood to also be applicable to other DC cases, such as LTE-NR DC, where NR is the master and LTE is the secondary node (NE-DC), NR-NR DC, where both the master and secondary nodes are NR nodes, or even between LTE/NR and other RATS. In some examples, the first network node 111 may be a gNB as MN, and the second network node 112 may be an eNB as SN.

Any of the first network node 111 and the second network node 112 may be of different classes, such as, e.g., macro base station, home base station or pico base station, based on transmission power and thereby also cell size. Any of the first network node 111 and the second network node 112 may support one or several communication technologies, and its name may depend on the technology and terminology used. In 5G/NR, any of the first network node 111 and the second network node 112 may be referred to as a gNB and may be directly connected to one or more core networks, which are not depicted in FIG. 1.

A plurality of wireless devices are located in the wireless communication network 100, whereof a wireless device 130, is depicted in the non-limiting example of FIG. 1. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the user equipments comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the first network node 111 in the first cell over a first link 141, e.g., a radio link. The wireless device 130 may be configured to communicate within the wireless communications network 100 with the first network node 111 in each of the one or more second cells over a respective second link, e.g., a radio link. The wireless device 130 may be configured to communicate within the wireless communications network 100 with the second network node 112 in the third cell over a third link 143, e.g., a radio link. The wireless device 130 may be configured to communicate within the wireless communications network 100 with the second network node 112 in each of the one or more fourth cells 124 over a respective fourth link, e.g., a radio link.

The first network node 111 and the second network node 112 may be configured to communicate within the wireless communications network 100 over a fifth link 150, e.g., a wired link or an X2 interface.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second" and/or "fourth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a network node, such as the second network node 112 or the first network node 111, e.g., a gNB, and embodiments related to a wireless device, such as the wireless device 130, e.g., a 5G UE.

It is an object of embodiments herein to improve the configuration of SRS and SRS transmissions. It is a particular object of embodiments herein to improve the configuration of the frequency allocation of the SRS and the SRS transmission.

The wireless device 130 embodiments relate to FIG. 2, FIG. 7 and FIGS. 9-14.

A method, performed by a wireless device such as the wireless device 130, is described herein. The method may be understood to be for configuring uplink sounding transmissions. The wireless device 130 may be configured with dual connectivity to be enabled to transmit using the first group of cells 121 and the second group of cells 123. The wireless device 130, the first group of cells 121 and the second group of cells 123 may be operating in the wireless communications network 100.

The method may comprise one or more of the following actions.

In some embodiments all the actions may be performed. One or more embodiments may be combined, where applicable. All possible combinations are not described to simplify the description. A non-limiting example of the method performed by the wireless device 130 is depicted in FIG. 2. Some actions may be performed in a different order than that shown in FIG. 2.

Receiving 201, from a network node 111, 112, different sets of configuration parameters for sounding signal transmissions for the wireless device. The sets of configuration parameters may be included in higher layer configuration, e.g. a RRC configuration or RRC Information Element such as SRS-Config. The RRC configuration or Information Element may include SRS Resource sets. The SRS Resource set may include SRS Resources which includes different configuration parameters. Each set of configuration parameters includes at least a time-domain parameter, such as whether the SRS position within a slot, and different frequency allocations. For example, FIG. 6 illustrates a SRS Resource included two different frequency allocations "Frequency Allocation 1" and "Frequency Allocation 2". Each of the frequency allocations can defined different frequency allocation parameters such as freqDomainPosition, freqHopping, freqDomainShift, c-SRS, b-SRS and b-hop. The wireless device 130 may be configured to perform this receiving action 201, e.g., by means of a receiving unit 701 within the wireless device 130, configured to perform this action. The receiving unit 701 may be the processor 706 of the wireless device 130, or an application running on such processor.

In some examples the SRS transmission is aperiodic SRS transmission.

In some examples the frequency allocation indicates which resource block, RB, to use for the SRS transmission. The RB to be used for SRS transmission may be indicated by the FDRA.

Receiving 202 from a network node, downlink control information, DCI, comprising information that indicates which of the configured frequency allocations that should be applied for the SRS transmission. The downlink control information, DCI, may trigger the SRS transmission. The DCI is received from a network node 111, 112. The DCI may be a DCI Format 0_1 or 0_2. In some embodiments an additional bitfield in the DCI is used to indicate which of the configured frequency allocations that should be applied. In one bit in the DCI is sufficient to switch between two frequency allocations. The wireless device 130 may be configured to perform this receiving action 202, e.g., by means of a receiving unit 702 within the wireless device 130, configured to perform this action. The receiving unit 702 may be the processor 706 of the wireless device 130, or an application running on such processor.

In some examples the DCI message may be a DCI 0_1 or DCI 0_2 Format.

Generating 203 a sounding reference signal based on the DCI. The wireless device generates SRS when it receives for example a DCI Format 0_1, DCI Format 0_2 or DCI Format 1_1. The wireless device will configure the SRS according to the configuration parameters received in, e.g., SRS-Config and information the DCI. The DCI provides information that indicates which of the configured frequency allocations that should be applied for the SRS transmission. The wireless device 130 may be configured to perform this generating action 203, e.g., by means of a generating unit 703 within the wireless device 130, configured to perform this action. The generating unit 703 may be the processor 706 of the wireless device 130, or an application running on such processor.

The wireless device 130 may also be configured to communicate user data with a host application unit in a host computer 1110, e.g., via another link such as 1150.

In FIG. 7, optional units are indicated with dashed boxes.

The wireless device 130 may comprise an interface unit to facilitate communications between the wireless device 130 and other nodes or devices, e.g., the network node 111, 112, the host computer 1110, or any of the other nodes. In some particular examples, the interface may, for example, include a transceiver configured to transmit and receive radio signals over an air interface in accordance with a suitable standard.

Figure 10:
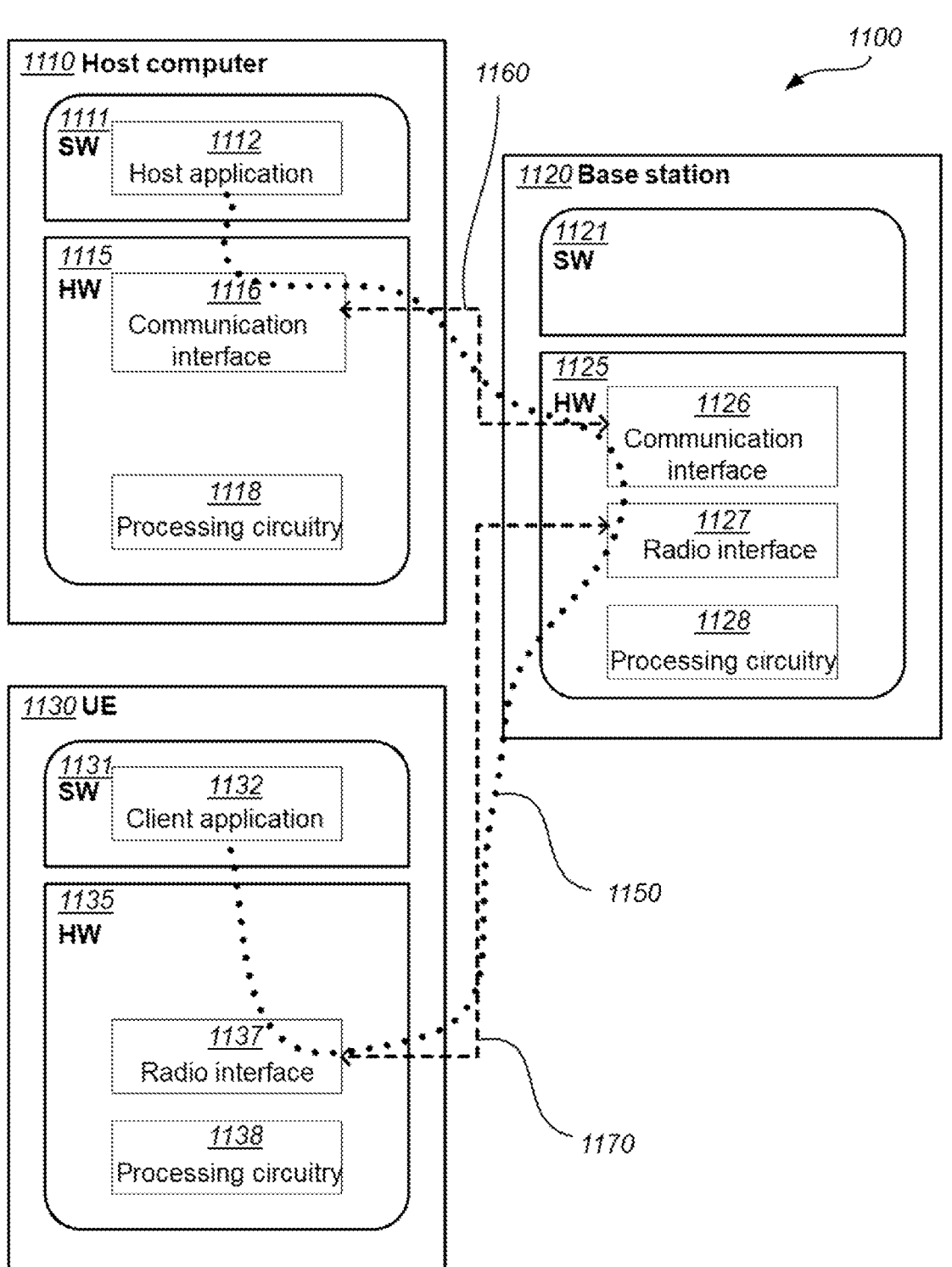
FIG. 10 is a generalized block diagram of a host computer communicating via a base station with a user equipment over a partially wireless connection, according to embodiments herein.

The wireless device 130 may comprise an arrangement as shown in FIG. 7 or in FIG. 10.

By the wireless device 130 receiving 201 a DCI triggering a SRS transmission and comprising information that indicates which of the configured frequency allocations that should be applied for the SRS transmission for the wireless device, the wireless device 130 is enabling aperiodic SRS an easier and faster way with more flexibility to allocate RB or other frequency allocations for SRS transmission compared to the RRC based configuration in NR.

The network node 111 embodiments relate to FIG. 3, FIG. 8 and FIGS. 9-14.

A method, performed by a network node, such as the network node 111 is described herein. The method may be understood to be configuring uplink sounding transmissions for a wireless device 130 in a wireless communication network. The wireless device 130 may be served by the first network node 111 using the first group of cells 121. The network node 111, and the wireless device 130 may be operating in the wireless communications network 100.

The method may comprise one or more of the following actions.

In some embodiments, all the actions may be performed. One or more embodiments may be combined, where applicable. All possible combinations are not described to simplify the description. A non-limiting example of the method performed by the first network node 111 is depicted in FIG. 3. Some actions may be performed in a different order than that shown in FIG. 3.

Sending 301, to a wireless device, different sets of configuration parameters for sounding signal transmissions for the wireless device. The sets of configuration parameters may be included in higher layer configuration, e.g. a RRC configuration or RRC Information Element such as SRS-Config. The RRC configuration or Information Element may include SRS Resource sets. The SRS Resource set may include SRS Resources which includes different configuration parameters. Each set of configuration parameters includes at least a time-domain parameter, such as whether the SRS position within a slot, and different frequency allocations. For example, FIG. 6 illustrates a SRS Resource included two different frequency allocations "Frequency Allocation 1" and "Frequency Allocation 2". Each of the frequency allocations can defined different frequency allocation parameters such as freqDomainPosition, freqHopping, freqDomainShift, c-SRS, b-SRS and b-hop. The network node 111 may be configured to perform this sending action 301, e.g. by means of a sending unit 801 within the network node 111, configured to perform this action. The sending unit 801 may be a processor 810 of the first network node 111, or an application running on such processor.

Sending may be performed, e.g., via the first link 141.

Sending 302, to the wireless device, downlink control information, DCI, comprising information that indicates which of the configured frequency allocations that should be applied for the SRS transmission. The downlink control information, DCI, may trigger the SRS transmission. The DCI is received from a network node 111, 112. The DCI may be a DCI Format 0_1 or 0_2. In some embodiments an additional bitfield in the DCI is used to indicate which of the configured frequency allocations that should be applied. In one bit in the DCI is sufficient to switch between two frequency allocations. The network node 111 may be configured to perform this sending action 302, e.g. by means of a sending unit 802 within the network node 111, configured to perform this action. The sending unit 802 may be a processor 810 of the first network node 111, or an application running on such processor.

Sending may be performed, e.g., via the first link 141.

Sending may be performed, e.g., via the first link 141.

Other units 811 may be comprised in the first network node 111.

The first network node 111 may also be configured to communicate user data with a host application unit in a host computer 1110, e.g., via another link such as 1150.

In FIG. 8, optional units are indicated with dashed boxes.

The first network node 111 may comprise an interface unit to facilitate communications between the first network node 111 and other nodes or devices, e.g., the another first network node 111, the wireless device 130, the host computer 1110, or any of the other nodes. In some particular examples, the interface may, for example, include a transceiver configured to transmit and receive radio signals over an air interface in accordance with a suitable standard.

The network node 111 may comprise an arrangement as shown in FIG. 8 or in FIG. 10.

Some embodiments herein will now be further described with some non-limiting examples.

In the following description, any reference to a/the UE, or simply "UE" may be understood to equally refer the wireless device 130; any reference to a/the gNBs may be understood to equally refer to the first network node 111, and/or the second network node 112; any reference to a/the first cell group or a/the a first cell group CG1 may be understood to equally refer the first group of cells 121; any reference to a/the second cell group or a/the a first cell group CG2 may be understood to equally refer the second group of cells 123.

A first group of examples will now be described.

DCI-format 0_1 and 0_2 (in the following 0_1 is used, but all also applies to 0_2) have a 1 bit flag indicating whether PUSCH is scheduled or not (called UL-SCH indicator). A value of "1" indicates UL-SCH shall be transmitted on the PUSCH and a value of "0" indicates UL-SCH shall not be transmitted on the PUSCH. In NR, a UE is not expected to receive a DCI format 0_1 with UL-SCH indicator of "0" and CSI request of all zero(s). Hence, when "0" is indicated, only CSI feedback is transmitted from the UE in the PUSCH, no UL-SCH. In this embodiment, a higher layer configuration from the gNB to the UE (i.e. RRC) is introduced, which indicates that when "0" is received, and CSI request is all zeros, then an SRS shall be transmitted. The legacy behaviour and the behavior related to the embodiment disclosed herein are summarized in the table below.

TABLE 1

| Legacy and new UE behaviour | | | |
|---|---|---|---|
| Flag (if configured) | CSI request field (if configured) | Legacy UE behaviour | New UE behaviour if configured by higher layers |
| 0 | Non-zeros | Transmit CSI | Transmit CSI |
| 0 | Zeros | Not allowed | Transmit aperiodic SRS |
| 1 | Non-zeros | Transmit UL-SCH and CSI | Transmit UL-SCH and CSI |
| 1 | Zeros | Transmit UL-SCH | Transmit UL-SCH |

In the embodiment, if this flag is set to zero and aperiodic SRS is triggered, the UE should use the Frequency domain resource assignment (FDRA) bitfield that is normally used to determine the frequency allocation for triggered PUSCH transmission, to instead determine the frequency allocation for the triggered SRS transmission. In an alternative solution, the unused "not allowed" codepoint in the table above is not used to indicate SRS transmission, instead a new RNTI, the SRS-RNTI is used to indicate that the FDRA in the DCI should be used to determine the SRS bandwidth for the triggered aperiodic SRS transmission.

In one embodiment, the UE interprets the frequency allocation bits in the DCI in the same way as it would interpret them for PUSCH scheduling by this DCI, ie. to indicate which RB to use for the SRS transmission. This means that the UE shall override (ignore) the RRC configured frequency allocation parameters, freqDomainPosition, freqDomainShift, c-SRS, b-SRS,b-hop. The UE may also ignore the SRS request field in the DCI 0_1. In an alternative embodiment, the FDRA is used in combination of one or more other fields in the DCI, such as the frequency hopping indicator, to determine the RB to be used for the SRS transmissions.

Alternatively, the parameters freqDomainPosition, freqDomainShift, c-SRS, b-SRS,b-hop are not configured if this new SRS transmission procedure is configured. A separate RRC parameter X can be introduced for this new SRS transmission procedure, and when X is set to "enabled", some of the SRS configuration parameters such as frequency domain parameters are not signaled by RRC. Instead, the frequency domain allocation (e.g. allocated RBs) is given from the gNB to the UE directly by the information in the DCI However, configuration such as used sequence and comb, which also are frequency domain parameters, can still be given by RRC configuration. Alternatively, the antenna port indication field in the DCI is used to indicate the comb to use for the SRS transmission, in which case the RRC configuration is not used to indicate the comb offset, only the number of combs (2 or 4).

When the new SRS transmission procedure is enabled, the time domain behaviour of the SRS resource(s) (such as repetition etc.) can still be attained from the RRC configuration setting and one out of multiple such RRC configured time domain behaviors can for example be selected by the aperiodic SRS triggering field in the DCI. Alternatively, the time domain resource allocation (TDRA) field is re-interpreted as to indicate the OFDM symbol(s) in one or more slots where the aperiodic SRS should be transmitted.

Note that if uplink resource allocation type 0 is used for PUSCH FDRA and reused for SRS, non-contiguous SRS transmission bandwidths are possible, i.e. the RB used for SRS transmissions are not consecutive. This is useful if transmission should be avoided in some narrow frequency bands due to other UEs transmitting narrowband PUSCH there. For example, a configured grant transmission to a UE may allow the UE to transmit a narrowband PUSCH in some band, and so it is useful to trigger an SRS for another UE that does not interfere with this narrowband PUSCH. Hence, Type 0 resource allocation can be used to create such a "hole" in the SRS transmission in frequency domain Alternatively, resource allocation type 0 is not allowed to be used when DCI 0_1 is used to trigger SRS where FDRA is used to indicate the RB used for SRS transmission.

The Rel.15 UE behavior of aperiodic SRS triggering is followed except that the BW of the SRS is the same as the BW of the PUSCH transmission in the same slot, if scheduled. Hence, the SRS trigger codepoint does not have information about the frequency domain allocation or has a bit field that indicates that the frequency domain info in this trigger codepoint should be ignored. If the UE is triggered SRS with this code point, then the RB allocation is taken from the FDRA, hence the same RB is used for PUSCH transmissions. Note that PUSCH may use frequency hopping, in case SRS use that as well. In case PUSCH is not triggered, neither for CSI or UL-SCH, then SRS inly is transmitted, where FDRA filed is used to indicate the RBs.

In another embodiment, the UEs re-uses the bit field in the DCI that normally is used to schedule PUSCH frequency allocation. This has the benefit that SRS resources can be easily scheduled in the same resources with PUSCH, since for example, the same domain resource allocation method is used for both PUSCH and SRS. A second benefit is that the network and UE need only one resource allocation method for both PUSCH and SRS, simplifying network scheduling as well as UE implementation.

To define the SRS resource allocation in frequency dimension the following parameters are configured (the table also indicates the number of possible states that can be configured for each parameter and how many bits it would take in a DCI to signal which of the state the UE should use for that parameter).

TABLE 2

Frequency allocations: Bitfields

| Parameter | # states | # bits | Comment |
|---|---|---|---|
| freqDomainPosition | 68 | 7 | Used to change the start position of Actual Sounding Bandwidth relative the start of the Maximum Sounding Bandwidth |
| freqDomainShift | 269 | 9 | Used to change the starting position of the Maximum Sounding Bandwidth. |
| c-SRS | 64 | 6 | Defines the size of the Maximum Sounding Bandwidth |
| b-SRS | 4 | 2 | Defines the size of the hopping bandwidth in case frequency hopping is used |
| b-hop | 4 | 2 | Defines the size of the Actual Sounding Bandwidth |

Hence, the PUSCH frequency allocation bit field is re-used to determine the parameters freqDomainPosition, freqDomainShift (this parameter might be optional to include since we might not want to schedule SRS transmission outside the Maximum Sounding Bandwidth anyway), c-SRS, b-SRS,b-hop. In total this would require approximately 17 bits (or 26 bits if also freqDomainShift is determined).

Since we do not schedule PUSCH, bits that are normally used for that can be reused to instead indicate SRS allocation, for example:

Frequency allocation (since PUSCH will not be transmitted, the frequency allocation of PUSCH is not needed) Type 0=10-69 bits depending on BRG size and BWP size (assuming minimum 20 PRB per BWP to be able to transmit SSBs Type 1=8-16 bits depending on BWP size Time domain allocation=0-4 bits depending on the number of entries in the higher layer parameter pusch-TimeDomainAllocationList (since PUSCH will not be transmitted, the time domain allocation of PUSCH is not needed)

Modulation and coding scheme=5 bits (since PUSCH will not be transmitted, the modulation and coding scheme to be used for the PUSCH transmission is not needed).

The frequency allocation indicated in DCI can be applied to all SRS resources that is triggered with the aperiodic trigger state indicated in DCI. However, it is also possible that multiple frequency allocations is signaled in the DCI, and that would allow to have independent frequency allocations for the different SRS resources triggered by that DCI.

A Second Group of Examples Will Now be Described

Figure 6A:
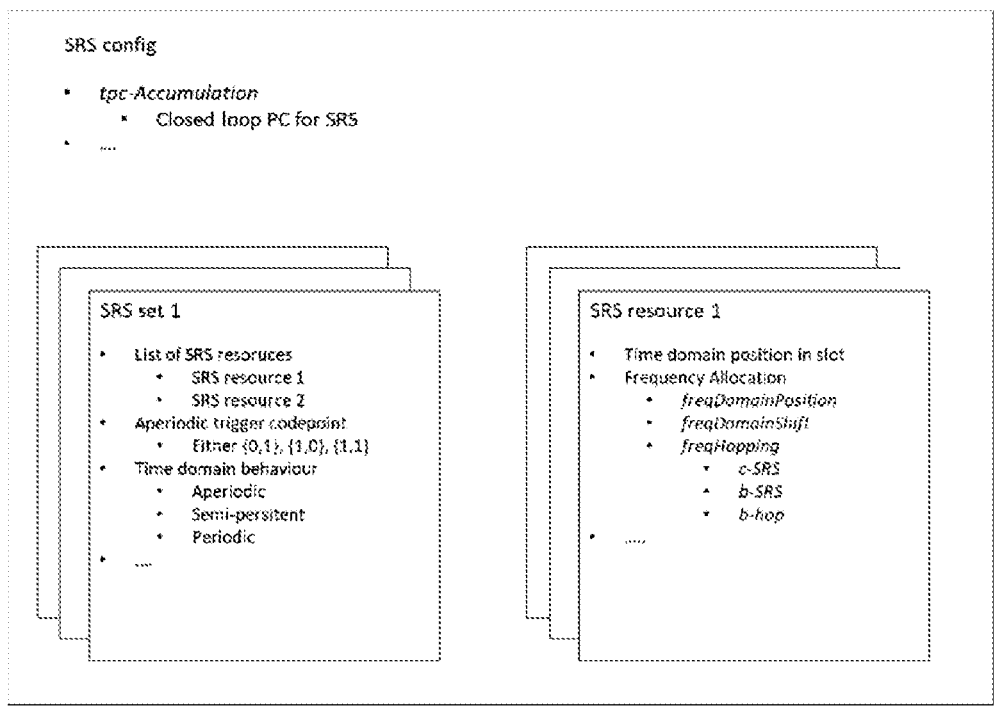
FIG. 6 is a schematic block diagram illustrating aspects of a method performed by wireless device, according to embodiments herein.

The SRS resources and SRS sets are configured in SRS-Config, schematically illustrated in FIG. 6a. As can be seen some things are configured on SRS-Config-level (for example TPC command for SRS power control)I, some on SRS set level (for example the association between an SRS set and an aperiodic trigger state in case the SRS set has an aperiodic time behaviour) and some on SRS resource level.

Figure 6B:
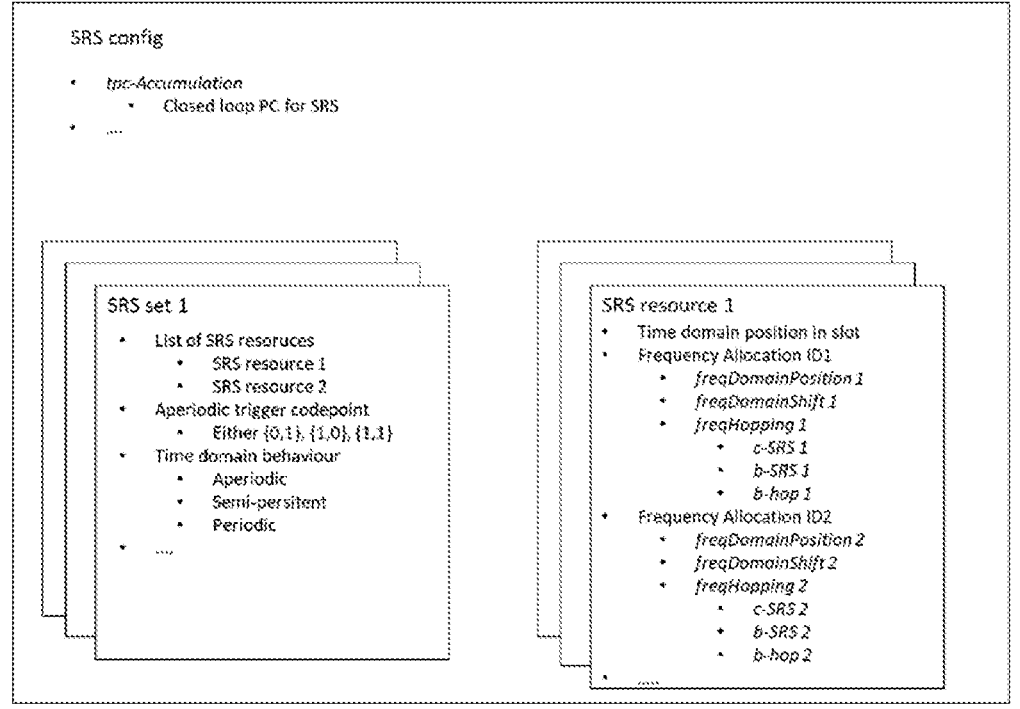

In some embodiment it is enabled to configure SRS resources with multiple different frequency allocations, as schematically illustrated in FIG. 6b. Note that this embodiment only is applicable for aperiodic SRS resources. When one or more SRS sets with aperiodic time domain behavior has been configured with SRS resources that are configured with multiple frequency allocations, an additional bitfield in the DCI format 0_1 is used to indicate which of the configured frequency allocations that should be applied. In the example in FIG. 6b, where SRS resource 1 has been configured with 2 different frequency allocations "Frequency Allocation 1" and "Frequency Allocation 2", one bit in DCI Format 0_1 will be enough to switch between the two frequency allocations.

A Third Group of Examples Will Now be Described

In some embodiments a higher layer parameter that indicates that an additional bit field is included in the DCI format that triggers the SRS transmission that indicates the frequency allocation for the triggered SRS resources. In one embodiment the following parameters are included in DCI:

freqDomainPosition (7 bits)
freqHopping
c-SRS (6 bits)
b-SRS (2 bits)
b-hop (2 bits)

Note that it is also possible to include the parameter freqDomainShift in DCI. This embodiment requires a larger bit field in the DCI format that triggers the SRS transmission compared to other embodiments. One advantage of this embodiment is that the network can use arbitrarily chosen frequency resources for each SRS resource every time it is triggered.

A Fourth Group of Examples Will Now be Described

When a UE or a set of UEs are scheduled repeatedly in a given set of PDSCH PRBs, it may be desirable to refresh channel estimates for those PRBs. If reciprocity is used, then transmitting SRS in the same PRBs occupied by the PDSCH may be used to refresh the channel estimates. Since the same PRBs are used on uplink and downlink, the frequency domain resource allocation for the SRS may not be needed, since it can be derived from the PDSCH resource allocation.

Therefore, in some embodiments, a downlink grant, such as DCI 1_1 or 1_2 triggers an SRS resource set to be transmitted, wherein the PRBs the SRS resource occupies are determined from the PRBs occupied by the PDSCH. The UE determines the occupied PRBs for the PDSCH from the frequency domain resource allocation in the grant, and transmits the SRS such that its occupied bandwidth is as close as possible to the bandwidth occupied by the PDSCH without being larger than that occupied by the PDSCH. The Rel-15 SRS mapping to resource elements is used, and therefore, the SRS bandwidth is a multiple of 4 PRBs.

In some such embodiments, the UE is configured to transmit the SRS bandwidth based on the PDSCH resource allocation on a per set basis, where if it does not transmit based on the PDSCH resource allocation, it transmits using Rel-16 aperiodic SRS configurations for the SRS resource set. In some embodiments, there is provided a method by a wireless device of configuring uplink sounding transmissions, the method comprising: receiving, from a network node, a downlink grant triggering a SRS transmission based on SRS set; determining, from the frequency domain resource allocation in the grant, the PRBs used the PDSCH; and generate a sounding reference signal based on the determined PRBs. In some embodiments the frequency allocation of the generated SRS is equal or smaller than the bandwidth of the PDSCH. In some embodiments the frequency allocation of the generated SRS is a multiple of 4 PRBs. In some embodiments the downlink grant is a DCI 1_1 or DCI 1_2.

A Fifth Group of Examples Will Now be Described

In some embodiments, there is an implicit rule such that if the UE is configured with a configured grant (CG) for a certain band, then it shall not transmit SRS in those RBs, i.e. to create a "hole" in the frequency allocation for the SRS sounding. This is beneficial since it is likely that many other UEs also have CG in that CG bandwidth, and to avoid SRS is colliding with a CG from another UE, these RBs can be configured to be automatically skipped from SRS transmission.

Figure 7A:
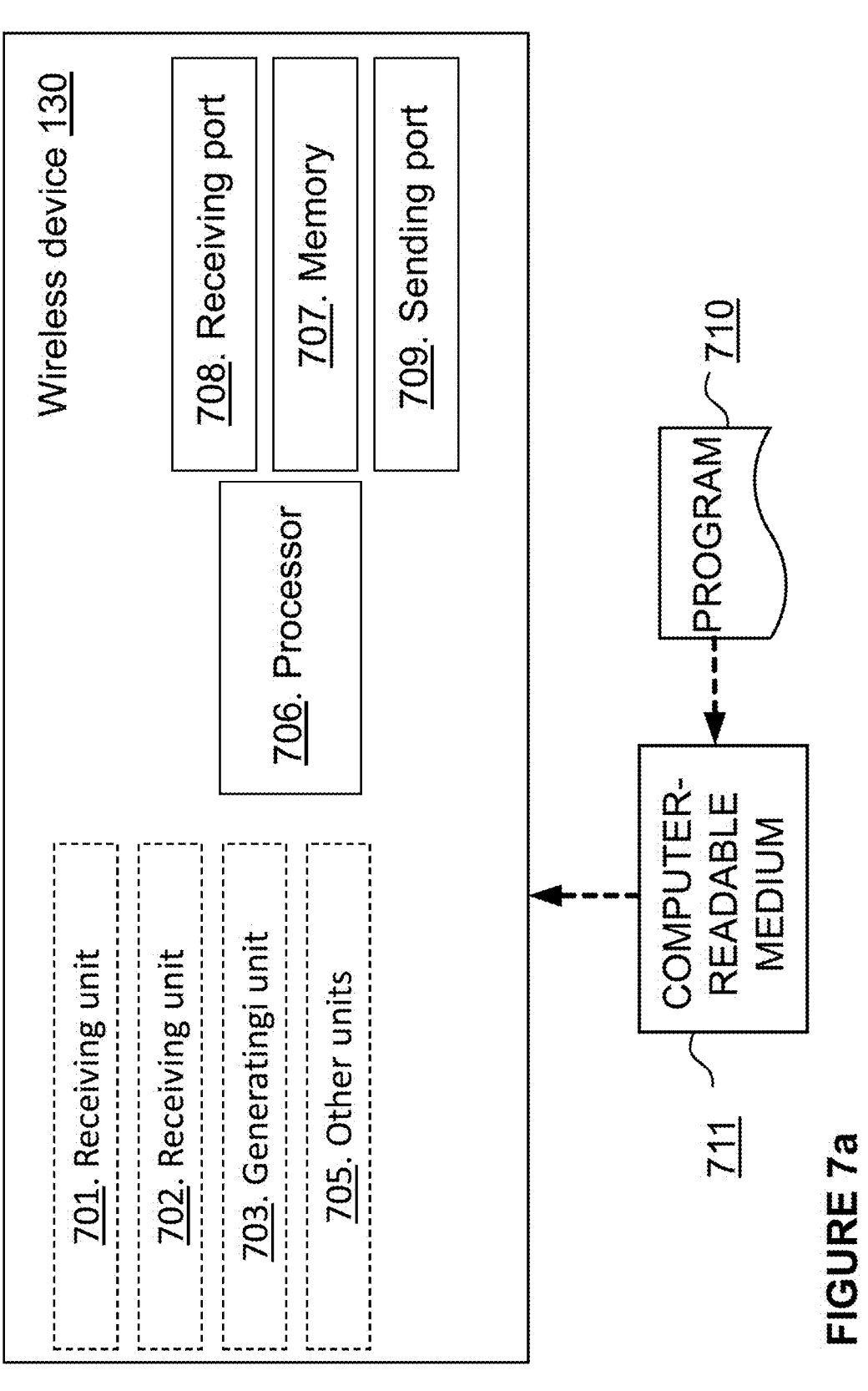
FIG. 7 is a schematic block diagram illustrating a wireless device, according to embodiments herein.

FIG. 7 depicts two different examples in panels a) and b), respectively, of the arrangement that the wireless device 130 may comprise to perform the method actions described above in relation to FIG. 2. In some embodiments, the wireless device 130 may comprise the following arrangement depicted in FIG. 7a.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130, and will thus not be repeated here.

In FIG. 7, optional modules are indicated with dashed boxes.

The embodiments herein in the wireless device 130 may be implemented through one or more processors, such as a processor 706 in the wireless device 130 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 707 comprising one or more memory units. The memory 707 is arranged to be used to store obtained information, store data, configurations, schedulings, and applications etc. to perform the methods herein when being executed in the wireless device 130.

In some embodiments, the wireless device 130 may receive information from, e.g., the first network node 111 and/or the second network node 112, through a receiving port 708. In some embodiments, the receiving port 708 may be, for example, connected to one or more antennas in wireless device 130. In other embodiments, the wireless device 130 may receive information from another structure in the wireless communications network 100 through the receiving port 708. Since the receiving port 708 may be in communication with the processor 706, the receiving port 708 may then send the received information to the processor 706. The receiving port 708 may also be configured to receive other information.

The processor 706 in the wireless device 130 may be further configured to transmit or send information to e.g., the first network node 111 and/or the second network node 112 or another structure in the wireless communications network 100, through a sending port 709, which may be in communication with the processor 706, and the memory 707.

Those skilled in the art will also appreciate that the receiving unit 701, the receiving unit 702, the generating unit 703 and the other units 705 described above may refer to a combination of analog and digital modules, and/or one or more processors configured with software and/or firmware, e.g., stored in memory, that, when executed by the one or more processors such as the processor 706, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-703 described above may be implemented as one or more applications running on one or more processors such as the processor 706.

Thus, the methods according to the embodiments described herein for the wireless device 130 may be respectively implemented by means of a computer program 710 product, comprising instructions, i.e., software code portions, which, when executed on at least one processor 706, cause the at least one processor 706 to carry out the actions described herein, as performed by the wireless device 130. The computer program 710 product may be stored on a computer-readable storage medium 711. The computer-readable storage medium 711, having stored thereon the computer program 710, may comprise instructions which, when executed on at least one processor 706, cause the at least one processor 706 to carry out the actions described herein, as performed by the wireless device 130. In some embodiments, the computer-readable storage medium 711 may be a non-transitory computer-readable storage medium, such as a CD ROM disc, or a memory stick. In other embodiments, the computer program 710 product may be stored on a carrier containing the computer program 710 just described, wherein the carrier is one of an electronic signal, optical signal, radio signal, or the computer-readable storage medium 711, as described above.

The wireless device 130 may comprise a communication interface configured to facilitate communications between the wireless device 130 and other nodes or devices, e.g., the first network node 111 or the second network node 112. The interface may, for example, include a transceiver configured to transmit and receive radio signals over an air interface in accordance with a suitable standard.

Figure 7B:
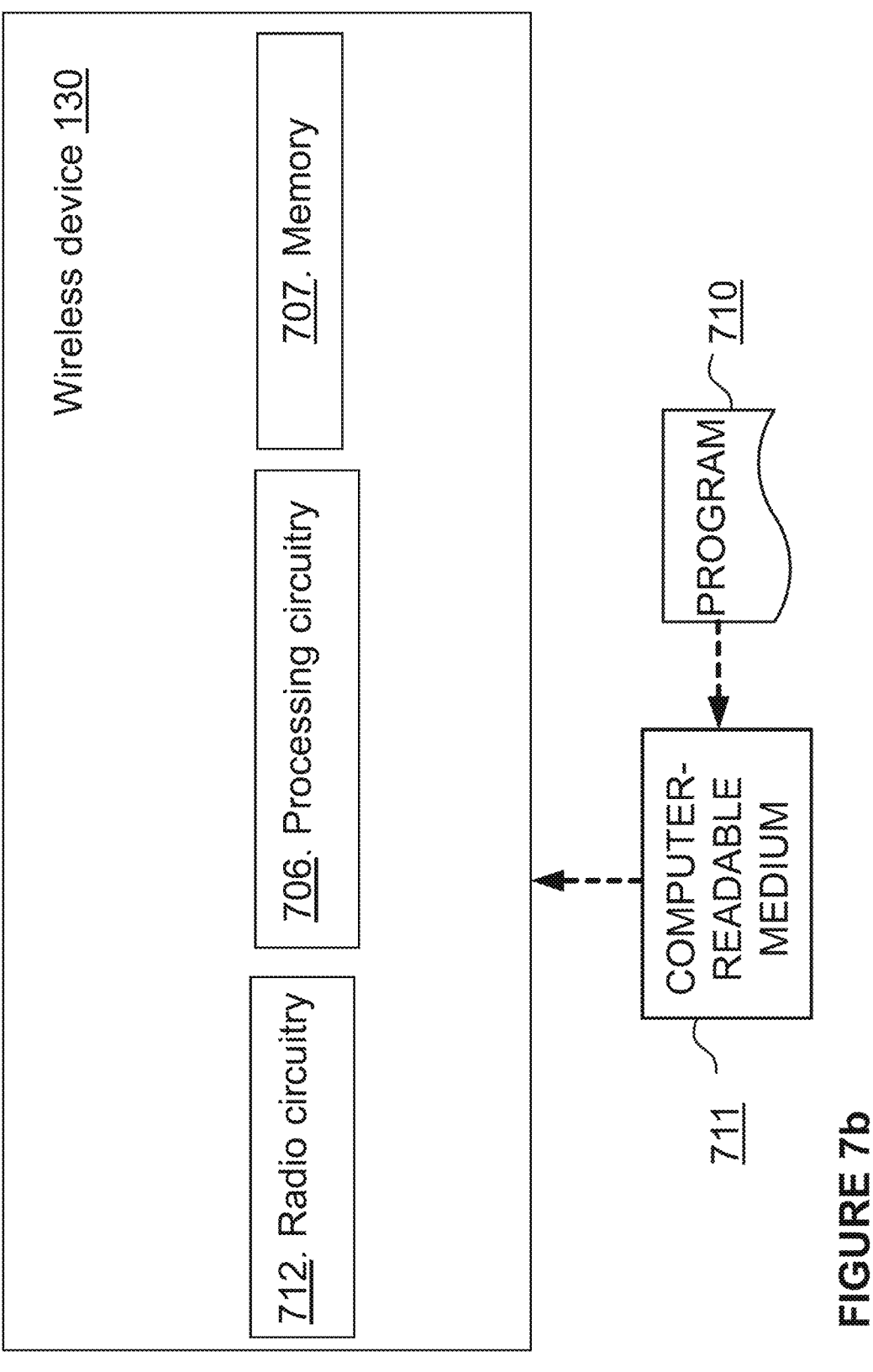

In other embodiments, the wireless device 130 may comprise the following arrangement depicted in FIG. 7b. The wireless device 130 may comprise a processing circuitry 706, e.g., one or more processors such as the processor 706, in the wireless device 130 and the memory 707. The wireless device 130 may also comprise a radio circuitry 712, which may comprise e.g., the receiving port 708 and the sending port 709. The processing circuitry 706 may be configured to, or operable to, perform the method actions according to FIG. 2, in a similar manner as that described in relation to FIG. 7a. The radio circuitry 712 may be configured to set up and maintain at least a wireless connection with the the first network node 111 and/or the second network node 112. Circuitry may be understood herein as a hardware component.

Hence, embodiments herein also relate to the wireless device 130 operative to configure SRS, the wireless device 130 being operative to operate in the wireless communications network 100. The wireless device 130 may comprise the processing circuitry 706 and the memory 707, said memory 707 containing instructions executable by said processing circuitry 706, whereby the wireless device 130 is further operative to perform the actions described herein in relation to the wireless device 130, e.g., in FIG. 2.

Figure 8A:
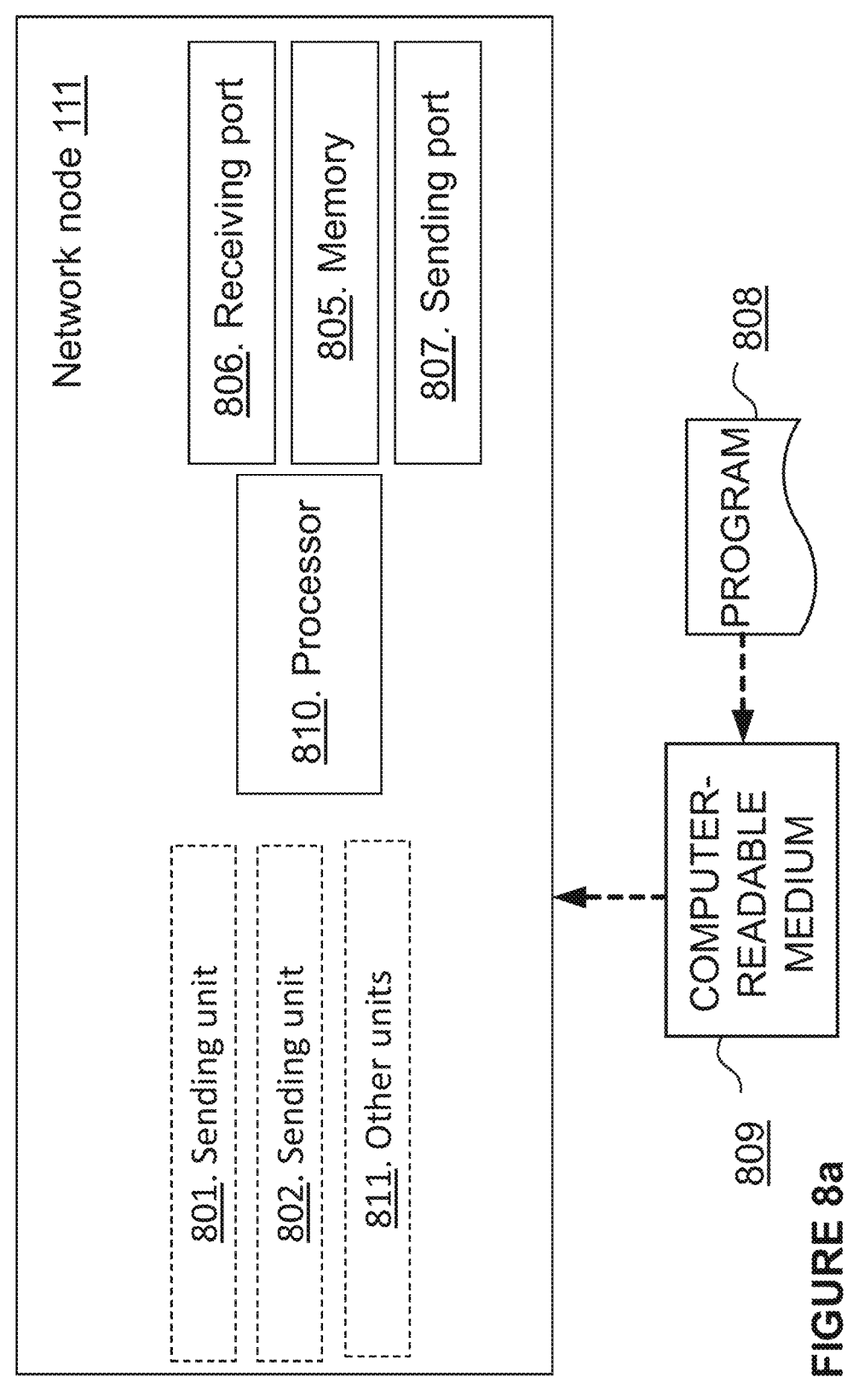
FIG. 8 is a schematic block diagram illustrating embodiments of a network node, according to embodiments herein.

FIG. 8 depicts two different examples in panels a) and b), respectively, of the arrangement that the first network node 111 may comprise to perform the method actions described above in relation to FIG. 3. In some embodiments, the first network node 111 may comprise the following arrangement depicted in FIG. 8a.

The embodiments herein in the first network node 111 may be implemented through one or more processors, such as a processor 810 in the first network node 111 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 805 comprising one or more memory units. The memory 805 is arranged to be used to store obtained information, store data, configurations, schedulings, and applications etc. to perform the methods herein when being executed in the first network node 111.

In some embodiments, the first network node 111 may receive information from, e.g., the second network node 112 and/or the wireless device 130, through a receiving port 806. In some embodiments, the receiving port 806 may be, for example, connected to one or more antennas in first network node 111. In other embodiments, the first network node 111 may receive information from another structure in the wireless communications network 100 through the receiving port 806. Since the receiving port 806 may be in communication with the processor 810, the receiving port 806 may then send the received information to the processor 810. The receiving port 806 may also be configured to receive other information.

The processor 810 in the first network node 111 may be further configured to transmit or send information to e.g., the second network node 112 and/or the wireless device 130, or another structure in the wireless communications network 100, through a sending port 807, which may be in communication with the processor 810, and the memory 805.

Those skilled in the art will also appreciate that the sending unit 801, the sending unit 802 and the other units 811 described above may refer to a combination of analog and digital modules, and/or one or more processors configured with software and/or firmware, e.g., stored in memory, that, when executed by the one or more processors such as the processor 810, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-802 and 811 described above may be implemented as one or more applications running on one or more processors such as the processor 810.

Thus, the methods according to the embodiments described herein for the first network node 111 may be respectively implemented by means of a computer program 808 product, comprising instructions, i.e., software code portions, which, when executed on at least one processor 810, cause the at least one processor 810 to carry out the actions described herein, as performed by the first network node 111. The computer program 808 product may be stored on a computer-readable storage medium 809. The computer-readable storage medium 809, having stored thereon the computer program 808, may comprise instructions which, when executed on at least one processor 810, cause the at least one processor 810 to carry out the actions described herein, as performed by the first network node 111. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The first network node 111 may comprise a communication interface configured to facilitate communications between the first network node 111 and other nodes or devices, e.g., the second network node 112 and/or the wireless device 130. The interface may, for example, include a transceiver configured to transmit and receive radio signals over an air interface in accordance with a suitable standard.

Figure 8B:
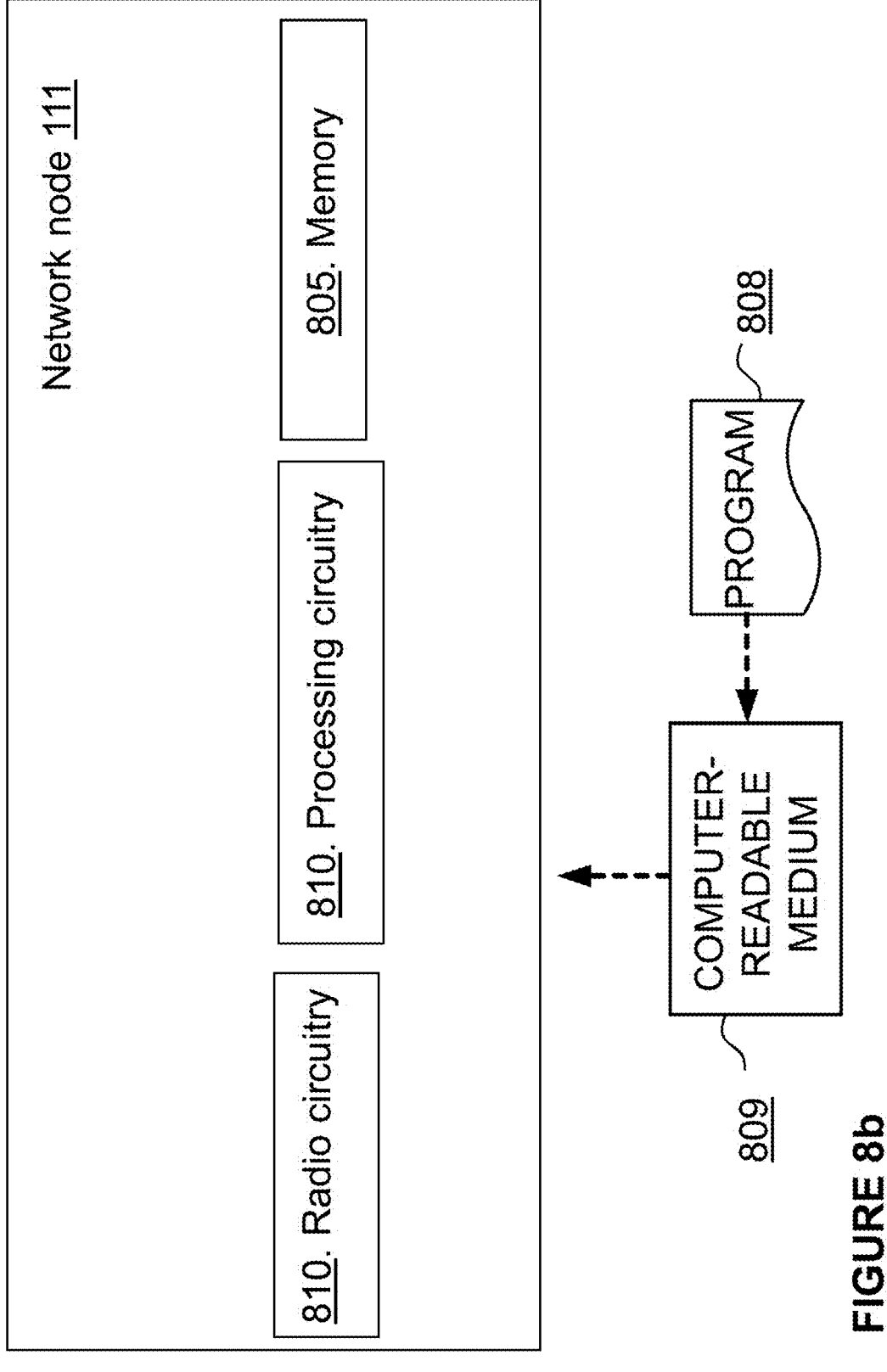

In other embodiments, the first network node 111 may comprise the following arrangement depicted in FIG. 8b. The first network node 111 may comprise a processing circuitry 810, e.g., one or more processors such as the processor 810, in the first network node 111 and the memory 805. The first network node 111 may also comprise a radio circuitry 810, which may comprise e.g., the receiving port 806 and the sending port 807. The processing circuitry 810 may be configured to, or operable to, perform the method actions according to FIG. 3, in a similar manner as that described in relation to FIG. 8a. The radio circuitry 810 may be configured to set up and maintain at least a wireless connection with the second network node 112 and/or the wireless device 130. Circuitry may be understood herein as a hardware component.

Hence, embodiments herein also relate to the first network node 111 comprising the processing circuitry 810 and the memory 805, said memory 805 containing instructions executable by said processing circuitry 810, whereby the first network node 111 is operative to perform the actions described herein in relation to the first network node 111, e.g., in FIG. 3.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Figure 9:
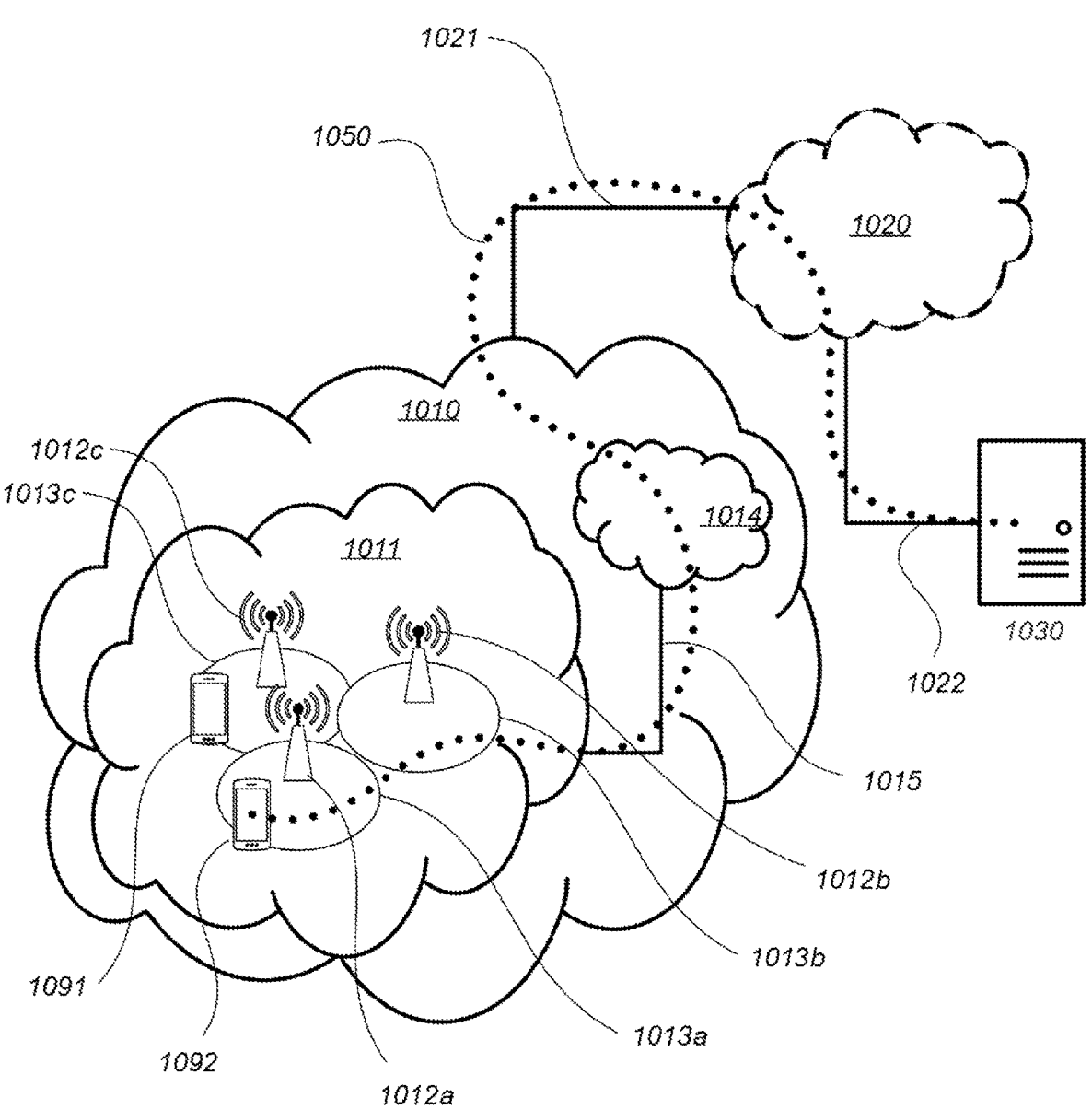
FIG. 9 is a schematic block diagram illustrating a telecommunication network connected via an intermediate network to a host computer, according to embodiments herein.

Examples Related to Embodiments Herein and Further Extensions and Variations Will Now be Described FIG. 9: Telecommunication network connected via an intermediate network to a host computer in accordance with some embodiments With reference to FIG. 9, in accordance with an embodiment, a communication system includes telecommunication network 1010 such as the wireless communications network 100, for example, a 3GPP-type cellular network, which comprises access network 1011, such as a radio access network, and core network 1014. Access network 1011 comprises a plurality of network nodes such as any of the first network node 111 and the second network node 112. For example, base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A plurality of wireless devices, such as the wireless device 130 are comprised in the wireless communications network 100. In FIG. 9, a first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012. Any of the UEs 1091, 1092 are examples of the wireless device 130.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 9 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

In relation to FIGS. 10, 11, 12, 13, and 14, which are described next, it may be understood that a UE is an example of the wireless device 130, and that any description provided for the UE equally applies to the wireless device 130. It may be also understood that the base station is an example of any of the first network node 111 and the second network node 112, and that any description provided for the base station equally applies to any of the first network node 111 and the second network node 112.

FIG. 10: Host computer communicating via a base station with a user equipment over a partially wireless connection in accordance with some embodiments Example implementations, in accordance with an embodiment, of the wireless device 130, e.g., a UE, the network node 110, e.g., a base station and host computer discussed in the preceding paragraphs will now be described with reference to FIG. 10. In communication system 1100, such as the wireless communications network 100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes any of the first network node 111 and the second network node 112, exemplified in FIG. 10 as a base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with the wireless device 130, exemplified in FIG. 11 as a UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 10) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 9, respectively. This is to say, the inner workings of these entities may be as shown in FIG. 10 and independently, the surrounding network topology may be that of FIG. 9.

In FIG. 10, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the coverage and data rate, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

FIG. 11: Methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figures 13, 14:
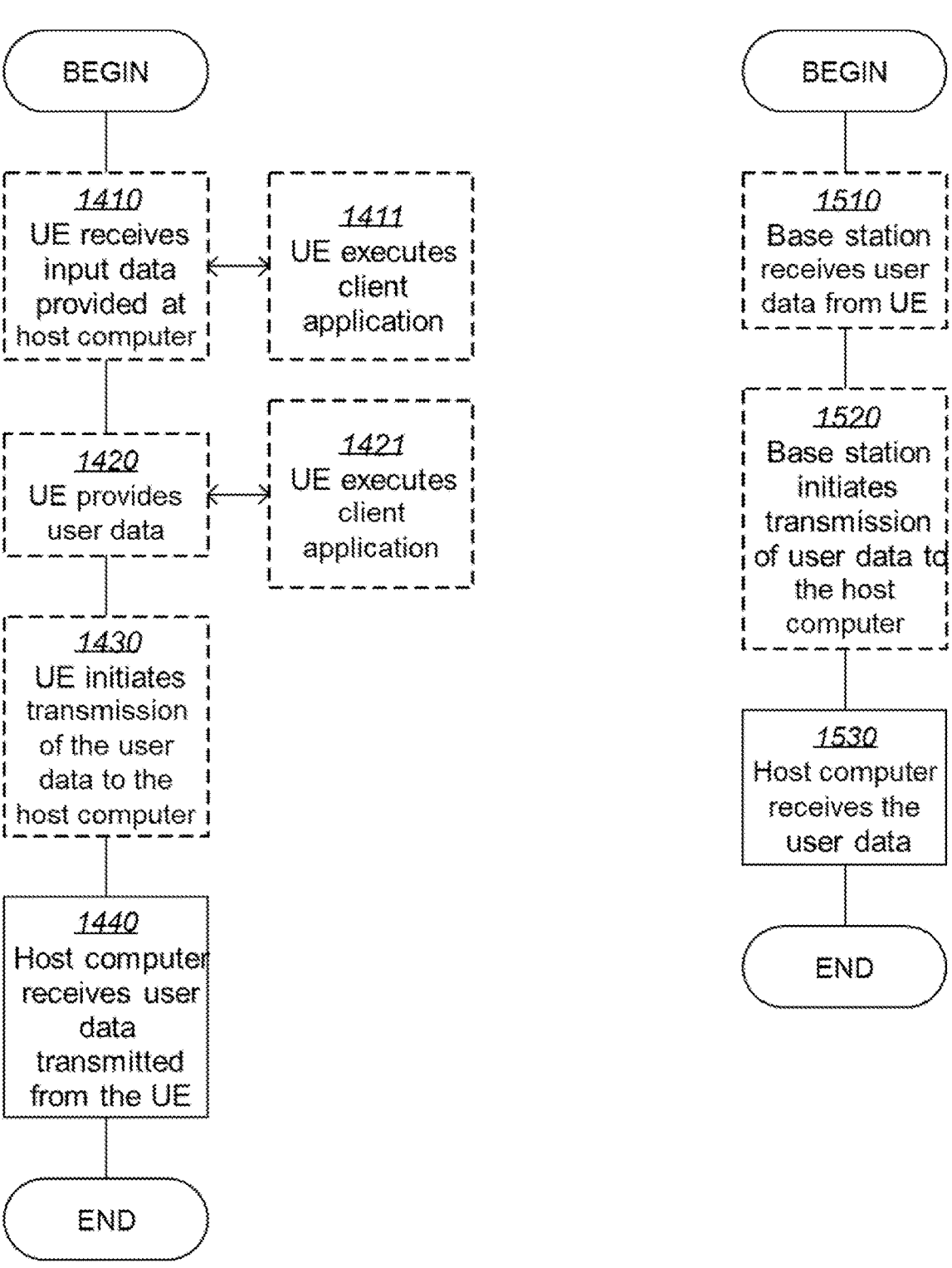
FIG. 13 is a flowchart depicting embodiments of a method in a communications system including a host computer, a base station and a user equipment, according to embodiments herein.
FIG. 14 is a flowchart depicting embodiments of a method in a communications system including a host computer, a base station and a user equipment, according to embodiments herein.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments Will Now be Described

Embodiment 1. A base station configured to communicate with a user equipment (UE). The base station includes a radio interface and processing circuitry configured to perform one or more of the actions described herein as performed by any of the first network node 111 and the second network node 112.

Embodiment 2. A communication system including a host computer including: processing circuitry configured to provide user data; and
a communication interface configured to forward the user data to a cellular network for transmission to a user equipment (UE). The cellular network includes a base station having a radio interface and processing circuitry. The base station's processing circuitry is configured to perform one or more of the actions described herein as performed by any of the first network node 111 and the second network node 112.

Embodiment 3. The communication system of embodiment 2, further including the base station.

Embodiment 4. The communication system of embodiment 36, further including the UE, wherein the UE is configured to communicate with the base station.

Embodiment 5. The communication system of embodiment 4, wherein: the processing circuitry of the host computer is configured to execute a host application, thereby providing the user data; and the UE includes processing circuitry configured to execute a client application associated with the host application.

Embodiment 6. A method implemented in a base station, including one or more of the actions described herein as performed by any of the first network node 111 and the second network node 112.

Embodiment 7. A method implemented in a communication system including a host computer, a base station and a user equipment (UE). The method including: at the host computer, providing user data; and at the host computer, initiating a transmission carrying the user data to the UE via a cellular network including the base station. The base station performs one or more of the actions described herein as performed by any of the first network node 111 and the second network node 112.

Embodiment 8. The method of embodiment 7, further including: at the base station, transmitting the user data.

Embodiment 9. The method of embodiment 8, wherein the user data is provided at the host computer by executing a host application. The method further including: at the UE, executing a client application associated with the host application.

Embodiment 10. A user equipment (UE) configured to communicate with a base station. The UE includes a radio interface and processing circuitry configured to perform one or more of the actions described herein as performed by the wireless device 130.

Embodiment 11. A communication system including a host computer including: processing circuitry configured to provide user data; and a communication interface configured to forward user data to a cellular network for transmission to a user equipment (UE). The UE includes a radio interface and processing circuitry. The UE's processing circuitry is configured to perform one or more of the actions described herein as performed by the wireless device 130.

Embodiment 12. The communication system of embodiment 11, further including the UE.

Embodiment 13. The communication system of embodiment 12, wherein the cellular network further includes a base station configured to communicate with the UE.

Embodiment 14. The communication system of embodiment 12 or 13, wherein: the processing circuitry of the host computer is configured to execute a host application, thereby providing the user data; and the UE's processing circuitry is configured to execute a client application associated with the host application.

Embodiment 15. A method implemented in a user equipment (UE), including one or more of the actions described herein as performed by the wireless device 130.

Embodiment 16. A method implemented in a communication system including a host computer, a base station and a user equipment (UE). The method including: at the host computer, providing user data; and at the host computer, initiating a transmission carrying the user data to the UE via a cellular network including the base station. The UE performs one or more of the actions described herein as performed by the wireless device 130.

Embodiment 17. The method of embodiment 16, further including: at the UE, receiving the user data from the base station.

Embodiment 18. A user equipment (UE) configured to communicate with a base station. The UE including a radio interface and processing circuitry configured to perform one or more of the actions described herein as performed by the wireless device 130.

Embodiment 19. A communication system including a host computer including: a communication interface configured to receive user data originating from a transmission from a user equipment (UE) to a base station. The UE includes a radio interface and processing circuitry, the UE's processing circuitry configured to: perform one or more of the actions described herein as performed by the wireless device 130.

Embodiment 20. The communication system of embodiment 19, further including the UE.

Embodiment 21. The communication system of embodiment 20, further including the base station. The base station includes a radio interface configured to communicate with the UE and a communication interface configured to forward to the host computer the user data carried by a transmission from the UE to the base station.

Embodiment 22. The communication system of embodiment 20 or 21, wherein: the processing circuitry of the host computer is configured to execute a host application; and the UE's processing circuitry is configured to execute a client application associated with the host application, thereby providing the user data.

Embodiment 23. The communication system of embodiment 46 or 47, wherein: the processing circuitry of the host computer is configured to execute a host application, thereby providing request data; and the UE's processing circuitry is configured to execute a client application associated with the host application, thereby providing the user data in response to the request data.

Embodiment 24. A method implemented in a user equipment (UE), including one or more of the actions described herein as performed by the wireless device 130.

Embodiment 25. The method of embodiment 24, further including: providing user data; and forwarding the user data to a host computer via the transmission to the base station.

Embodiment 26. A method implemented in a communication system including a host computer, a base station and a user equipment (UE). The method including: at the host computer, receiving user data transmitted to the base station from the UE, wherein the UE performs one or more of the actions described herein as performed by the wireless device 130.

Embodiment 27. The method of embodiment 26, further including: at the UE, providing the user data to the base station.

Embodiment 28. The method of embodiment 27, further including: at the UE, executing a client application, thereby providing the user data to be transmitted; and at the host computer, executing a host application associated with the client application.

Embodiment 29. The method of embodiment 27, further including: at the UE, executing a client application; and at the UE, receiving input data to the client application, the input data being provided at the host computer by executing a host application associated with the client application. The user data to be transmitted is provided by the client application in response to the input data.

Embodiment 30. A base station configured to communicate with a user equipment (UE). The base station includes a radio interface and processing circuitry configured to perform one or more of the actions described herein as performed by any of the first network node 111 and the second network node 112.

Embodiment 31. A communication system including a host computer comprising a communication interface configured to receive user data originating from a transmission from a user equipment (UE) to a base station. The base station includes a radio interface and processing circuitry. The base station's processing circuitry is configured to perform one or more of the actions described herein as performed by any of the first network node 111 and the second network node 112.

Embodiment 32. The communication system of embodiment 31, further including the base station.

Embodiment 33. The communication system of embodiment 32, further including the UE. The UE is configured to communicate with the base station.

Embodiment 34. The communication system of embodiment 33, wherein: the processing circuitry of the host computer is configured to execute a host application. The UE is configured to execute a client application associated with the host application, thereby providing the user data to be received by the host computer.

Embodiment 35. A method implemented in a base station, including one or more of the actions described herein as performed by any of the first network node 111 and the second network node 112.

Embodiment 36. A method implemented in a communication system including a host computer, a base station and a user equipment (UE). The method including: at the host computer, receiving, from the base station, user data originating from a transmission which the base station has received from the UE. The UE performs one or more of the actions described herein as performed by the wireless device 130.

Embodiment 37. The method of embodiment 36, further including: at the base station, receiving the user data from the UE.

Embodiment 38. The method of embodiment 37, further including: at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
ASN Abstract Syntax Notation
CE Control Element
CSI Channel State Information
CSI-RS Channel State Information Reference Signal
DCI Downlink Control Information
DL Downlink
FR2 Frequency Range 2
gNB gNodeB
LTE Long Term Evolution
MAC Medium Access Control
MIMO Multiple-Input Multiple-Output
MCS Modulation and Coding Scheme
NR New Radio
OFDM Orthogonal Frequency-Division Multiplexing
PC Power Control
PDCCH Physical Downlink Control Channel
PSD Power Spectral Density
PUSCH Physical Uplink Shared Channel
RB Resource Block
RRC Radio Resource Control
RS Reference Signal
RSRP Reference Signal Received Power
SRS Sounding Reference Signal
SSB Synchronization Signal Block
UE User Equipment
UL Uplink

34

Claims are provided below. Reference numbers/letters are provided in parenthesis by way of example/illustration without limiting claims to particular elements indicated by reference numbers/letters.

The invention claimed is:

1. A method performed by a wireless device of configuring uplink sounding transmissions, the method comprising:
receiving, from a network node, different sets of configuration parameters for sounding signal transmissions for the wireless device, each of the different sets of configuration parameters comprising a time-domain parameter and different frequency allocations;
receiving, from a network node, downlink control information, DCI, comprising information that indicates which of the configured frequency allocations that should be applied for sounding reference signal, SRS, transmission;
generating a SRS based on the received DCI, the wireless device being configured to use an implicit rule such that if the wireless device is configured with a configured grant, CG, for a frequency band comprising at least one resource block, RB, then the wireless device shall not generate the SRS with frequency allocation in the at least one RB; and
triggering an aperiodic SRS transmission of the generated SRS based on a received radio resource control, RRC, indication.

2. The method of claim 1, wherein the configuring uplink sounding transmissions comprises configuring aperiodic SRS transmission.

3. The method of claim 2, wherein the different sets of configuration parameters are comprised a RRC message.

4. The method of claim 3, wherein the RRC message comprises the information element SRS-Config.

5. The method of claim 1, wherein the different sets of configuration parameters are comprised in a SRS Resource.

6. A wireless device comprising:
processing circuitry; and
memory coupled with the processing circuitry, the memory including instructions that when executed by the processing circuitry causes the wireless device to:
receive, from a network node, different sets of configuration parameters for sounding signal transmissions for the wireless device, each of the different sets of configuration parameters comprising a time-domain parameter and different frequency allocations;
receive, from a network node, downlink control information, DCI, comprising information that indicates which of the configured frequency allocations that should be applied for sounding reference signal, SRS, transmission;
generate a SRS based on the received DCI, the wireless device being configured to use an implicit rule such that if the wireless device is configured with a configured grant, CG, for a frequency band comprising at least one resource block, RB, then the wireless device shall not generate the SRS with frequency allocation in the at least one RB; and
trigger an aperiodic SRS transmission of the generated SRS based on a received radio resource control, RRC, indication.

7. A method performed by a network node of configuring uplink sounding transmissions, the method comprising:
sending, to a wireless device, different sets of configuration parameters for sounding signal transmissions for the wireless device, each of the different sets of configuration parameters comprising a time-domain parameter and different frequency allocations;

sending, to a wireless device, downlink control information, DCI, comprising information that indicates which of the configured frequency allocations that should be applied for the SRS transmission such that, if the wireless device is configured with a configured grant, CG, for a frequency band comprising at least one resource block, RB, then the wireless device, using an implicit rule, shall not generate the SRS with frequency allocation in the at least one RB; and triggering an aperiodic SRS transmission by the wireless device by sending a radio resource control, RRC, indication to the wireless device.

8. The method of claim 7, wherein configuring uplink sounding transmissions comprises configuring aperiodic SRS transmission.

9. The method of claim 8, wherein the different sets of configuration parameters are comprised a RRC message.

10. The method of claim 9, wherein the RRC message comprises the information element SRS-Config.

11. The method of claim 7, wherein the different sets of configuration parameters are comprised in a SRS Resource.

12. The method of claim 11, wherein the SRS Resource is comprised in an RRC Information Element SRS Resource Set.

13. The method of claim 7, wherein the DCI is a DCI Format 0_1 and the information that indicates which of the configured frequency allocations that should be applied for the SRS transmission comprises 1 bit.

14. A network node comprising:

processing circuitry; and memory coupled with the processing circuitry, the memory including instructions that when executed by the processing circuitry causes the first network node to:

send, to a wireless device, different sets of configuration parameters for sounding signal transmissions for the wireless device, each of the different sets of configuration parameters comprising a time-domain parameter and different frequency allocations;

send, to a wireless device, downlink control information, DCI, comprising information that indicates which of the configured frequency allocations that should be applied for the SRS transmission such that, if the wireless device is configured with a configured grant, CG, for a frequency band comprising at least one resource block, RB, then the wireless device, using an implicit rule, shall not generate the SRS with frequency allocation in the at least one RB; and trigger an aperiodic SRS transmission by the wireless device by sending a radio resource control, RRC, indication to the wireless device.

15. The method of claim 2, wherein the different sets of configuration parameters are comprised in a SRS Resource.

16. The method of claim 3, wherein the different sets of configuration parameters are comprised in a SRS Resource.

17. The method of claim 8, wherein the different sets of configuration parameters are comprised in a SRS Resource.

18. The method of claim 9, wherein the different sets of configuration parameters are comprised in a SRS Resource.

19. The method of claim 8, wherein the DCI is a DCI Format 0_1 and the information that indicates which of the configured frequency allocations that should be applied for the SRS transmission comprises 1 bit.

20. The method of claim 9, wherein the DCI is a DCI Format 0_1 and the information that indicates which of the configured frequency allocations that should be applied for the SRS transmission comprises 1 bit.

\* \* \* \* \*